(12) United States Patent
Stahl et al.

(10) Patent No.: US 12,412,186 B2
(45) Date of Patent: Sep. 9, 2025

(54) METHODS, SYSTEMS, ARTICLES OF MANUFACTURE AND APPARATUS FOR CONFIGURABLE SEGMENTATION OF PRODUCT ASSORTMENTS

(71) Applicant: Nielsen Consumer LLC, Chicago, IL (US)

(72) Inventors: Doreen Stahl, New York, NY (US); Madison R. Smith, Chicago, IL (US); Bruce C. Richardson, Arlington Heights, IL (US); Larry P. Menke, Chicago, IL (US)

(73) Assignee: Nielsen Consumer LLC, Chicago, IL (US)

( * ) Notice: Subject to any disclaimer, the term of this patent is extended or adjusted under 35 U.S.C. 154(b) by 0 days.

(21) Appl. No.: 17/955,983

(22) Filed: Sep. 29, 2022

(65) Prior Publication Data

US 2023/0259958 A1    Aug. 17, 2023

Related U.S. Application Data

(60) Provisional application No. 63/303,891, filed on Jan. 27, 2022.

(51) Int. Cl.
*G06Q 30/0201* (2023.01)
*G06Q 10/0637* (2023.01)
*G06Q 30/0202* (2023.01)

(52) U.S. Cl.
CPC ... *G06Q 30/0201* (2013.01); *G06Q 10/06375* (2013.01); *G06Q 30/0202* (2013.01)

(58) Field of Classification Search
CPC ......... G06Q 30/0201; G06Q 10/06375; G06Q 30/0202
See application file for complete search history.

(56) References Cited

U.S. PATENT DOCUMENTS

| | | | |
|---|---|---|---|
| 5,446,890 | A | 8/1995 | Renslo et al. |
| 6,035,284 | A | 3/2000 | Straub et al. |

(Continued)

FOREIGN PATENT DOCUMENTS

| | | |
|---|---|---|
| CA | 2798944 A1 | 2/2013 |
| WO | 2008121884 A1 | 10/2008 |
| WO | 2019133337 A1 | 7/2019 |

OTHER PUBLICATIONS

France Intellectual Property Office, "Notification Before Rejection Decision," issued in connection with French Patent Application No. 2300563, mailed on Aug. 2, 2023, 4 pages. [English Machine Translation Included].

(Continued)

*Primary Examiner* — Dylan C White
(74) *Attorney, Agent, or Firm* — HANLEY, FLIGHT & ZIMMERMAN, LLC

(57) ABSTRACT

Methods, apparatus, systems and articles of manufacture are disclosed for text extraction from a receipt image. An example non-transitory computer readable medium is disclosed comprising instructions that, when executed, cause a machine to at least generate a baseline product hierarchy using product information, calculate categorical impact values for products in the baseline product hierarchy, calculate an average impact value for the baseline product hierarchy using the calculated categorical impact values, calculate a first weighting factor for respective ones of the products based on a comparison between the categorical impact values and the average impact value, calculate a second weighting factor associated with respective ones of the products in the baseline product hierarchy based on sales data, and generate final weighted categorical impact values based on (a) the first weighting factors, (b) the second (Continued)

weighting factors and (c) the categorical impact values corresponding to the respective ones of the products.

13 Claims, 14 Drawing Sheets

(56) References Cited

U.S. PATENT DOCUMENTS

| | | |
|---|---|---|
| 6,611,726 B1 | 8/2003 | Crosswhite |
| 7,080,026 B2 | 7/2006 | Singh et al. |
| 7,406,435 B2 | 7/2008 | Aronowich et al. |
| 7,424,440 B1 | 9/2008 | Gupta et al. |
| 7,689,457 B2 | 3/2010 | Chan et al. |
| 7,743,059 B2 | 6/2010 | Chan et al. |
| 7,966,225 B2 | 6/2011 | Chan et al. |
| 8,019,766 B2 | 9/2011 | Chan et al. |
| 8,065,203 B1 | 11/2011 | Chien et al. |
| 8,073,727 B2 | 12/2011 | Mneimneh et al. |
| 8,543,446 B2 * | 9/2013 | Richardson ........ G06Q 30/0201 705/7.31 |
| 8,560,545 B2 | 10/2013 | Chan et al. |
| 8,676,632 B1 | 3/2014 | Watson et al. |
| 9,280,757 B2 | 3/2016 | Parpia et al. |
| 9,412,109 B2 | 8/2016 | Nelson et al. |
| 9,785,953 B2 | 10/2017 | Desai |
| 10,997,615 B1 | 5/2021 | Alvarez |
| 11,568,469 B1 | 1/2023 | Zhang |
| 2002/0082902 A1 | 6/2002 | Ando et al. |
| 2002/0169665 A1 | 11/2002 | Hughes et al. |
| 2003/0171979 A1 * | 9/2003 | Jenkins ............ G06Q 10/06375 705/35 |
| 2004/0068431 A1 | 4/2004 | Smith et al. |
| 2004/0141003 A1 | 7/2004 | Nivers et al. |
| 2007/0078700 A1 | 4/2007 | Lenzmann et al. |
| 2008/0021765 A1 * | 1/2008 | Cereghini ............ G06Q 30/02 705/7.31 |
| 2008/0077459 A1 | 3/2008 | Desai |
| 2008/0275727 A1 | 11/2008 | Koo et al. |
| 2009/0018996 A1 | 1/2009 | Hunt et al. |
| 2009/0172024 A1 | 7/2009 | Hsu et al. |
| 2009/0216611 A1 * | 8/2009 | Leonard ................ G06Q 30/02 705/7.31 |
| 2009/0259509 A1 | 10/2009 | Landvater |
| 2010/0138281 A1 * | 6/2010 | Zhang ................ G06Q 10/087 705/28 |
| 2011/0251875 A1 | 10/2011 | Cosman |
| 2011/0264598 A1 | 10/2011 | Fuxman |
| 2012/0259676 A1 | 10/2012 | Wagner |
| 2012/0296699 A1 * | 11/2012 | Richardson ........ G06Q 30/0201 705/7.31 |
| 2013/0117165 A1 | 5/2013 | Bai et al. |
| 2014/0025418 A1 | 1/2014 | Huang et al. |
| 2014/0040081 A1 | 2/2014 | Marwah et al. |
| 2014/0114796 A1 | 4/2014 | Huang et al. |
| 2014/0114797 A1 | 4/2014 | Huang et al. |
| 2014/0136537 A1 | 5/2014 | Nelson et al. |
| 2014/0257912 A1 | 9/2014 | Hsieh et al. |
| 2014/0279035 A1 | 9/2014 | Fleming |
| 2014/0279114 A1 | 9/2014 | Reing-Hurley |
| 2015/0046251 A1 | 2/2015 | Smith |
| 2015/0193784 A1 | 7/2015 | Gao |
| 2015/0193791 A1 | 7/2015 | Gao |
| 2015/0332298 A1 | 11/2015 | Ettl |
| 2015/0348057 A1 | 12/2015 | Parpia et al. |
| 2016/0019625 A1 | 1/2016 | Parpia et al. |
| 2016/0117702 A1 | 4/2016 | Chigurupati |
| 2016/0189177 A1 | 6/2016 | Parpia et al. |
| 2016/0189278 A1 | 6/2016 | Parpia et al. |
| 2017/0024186 A1 | 1/2017 | Fazl Ersi |
| 2017/0109767 A1 | 4/2017 | Shpanya |
| 2019/0197564 A1 | 6/2019 | Calmon et al. |
| 2019/0205806 A1 | 7/2019 | Karmakar |
| 2019/0205823 A1 | 7/2019 | Karmakar |
| 2020/0019908 A1 | 1/2020 | Kolluru |
| 2020/0027099 A1 | 1/2020 | Manna |
| 2020/0043022 A1 | 2/2020 | Karmakar |
| 2020/0387302 A1 | 12/2020 | Uttam |
| 2021/0109906 A1 | 4/2021 | Kuledge et al. |
| 2021/0174284 A1 | 6/2021 | Karmakar |
| 2021/0304233 A1 | 9/2021 | Jain |
| 2023/0244837 A1 | 8/2023 | Kühn |
| 2023/0259958 A1 | 8/2023 | Stahl et al. |

OTHER PUBLICATIONS

Canadian Intellectual Property Office, "Examiner Requisition," issued in connection with Canadian Patent Application No. 3,181,956, dated Apr. 29, 2024, 5 pages.

Kusiak et al., "Planning product configurations based on sales data," IEEE Transactions on Systems, Man, and Cybernetics, Part C (Applications and Reviews), vol. 37, Issue 4, Jul. 2007, 8 pages.

United States Patent and Trademark Office, "Non-Final Office Action," issued in connection with U.S. Appl. No. 17/836,826, dated Jul. 11, 2024, 69 pages.

United States Patent and Trademark Office, "Final Office Action," issued in connection with U.S. Appl. No. 17/836,826, dated Jan. 13, 2025, 43 pages.

Canadian Patent Office, "Requisition by the Examiner," issued in connection with CA Patent Application No. 3,181,956, mailed on Jun. 5, 2025, 4 pages.

United States Patent and Trademark Office, "Non-Final Office Action," issued in connection with U.S. Appl. No. 17/836,826, dated Jul. 16, 2025, 22 pages.

* cited by examiner

| OBSERVATION # | PRODUCT NODE | SALES INSTANCES (DEPENDENT VARIABLE) | # MY ITEMS | # COMPETITIVE ITEMS | TOTAL IMPACT (TI) |
|---|---|---|---|---|---|
| 1 | 1 | 1044 | 60 | 39 | 20 |
| 2 | 1 | 1080 | 58 | 20 | 18 |
| 3 | 1 | 1248 | 69 | 33 | 23 |
| 4 | 1 | 964 | 57 | 44 | 10 |
| 5 | 1 | 1204 | 69 | 44 | 22 |
| 6 | 1 | 856 | 51 | 41 | -5 |
| 7 | 1 | 1252 | 67 | 22 | 24 |
| 8 | 1 | 924 | 53 | 34 | 9 |
| 9 | 1 | 1124 | 63 | 34 | 13 |
| 10 | 1 | 904 | 51 | 29 | -2 |

FIG. 1

METHODS, SYSTEMS, ARTICLES OF MANUFACTURE AND APPARATUS FOR CONFIGURABLE SEGMENTATION OF PRODUCT ASSORTMENTS

FIELD OF THE DISCLOSURE

This disclosure relates generally to product assortments, and, more particularly, to methods, systems, articles of manufacture and apparatus for configurable segmentation of product assortments.

RELATED APPLICATION

Application No. 63/303,891, which was filed on Jan. 27, 2022. U.S. Provisional Patent Application No. 63/303,891 is hereby incorporated herein by reference in its entirety. Priority to U.S. Provisional Patent Application No. 63/303,891 is hereby claimed.

BACKGROUND

Retailers or consultants to retailers consider which product(s) to place in an aisle and determine which competitive or complimentary products should accompany such product(s). In some examples, proximity of a product of interest to a competitive product will cause one of the two products to increase its sales volume at the expense of the other product. This effect is sometimes referred to as cannibalization.

BRIEF DESCRIPTION OF THE DRAWINGS

FIG. 1 depicts an example dataset from which a baseline product hierarchy may be constructed.

Figure 2:
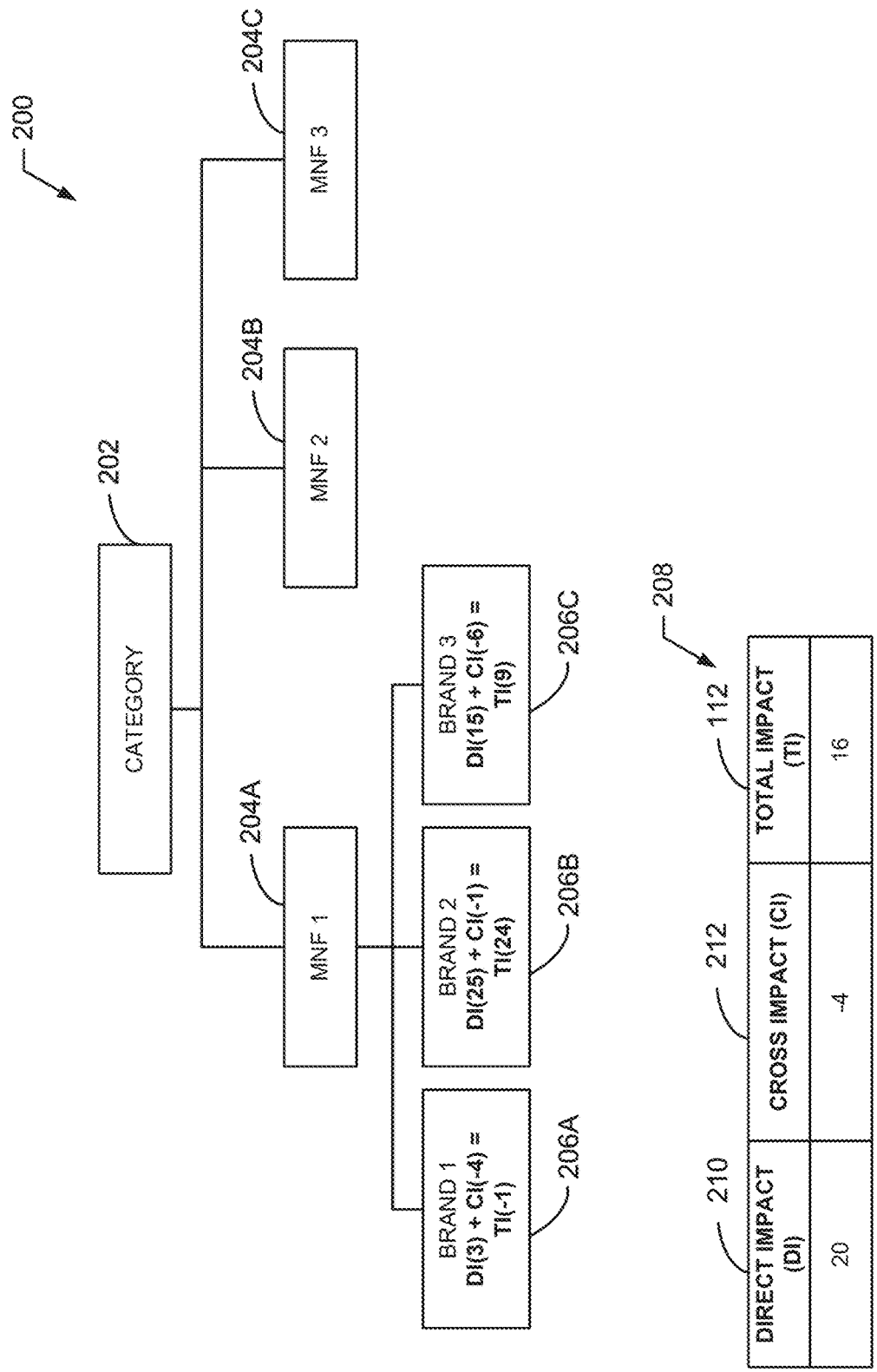
FIG. 2 illustrates an example baseline product hierarchy generated using the example dataset of FIG. 1, in accordance with the teachings of this disclosure.

In general, the same reference numbers will be used throughout the drawing(s) and accompanying written description to refer to the same or like parts. The figures are not to scale. Instead, the thickness of the layers or regions may be enlarged in the drawings. In general, the same reference numbers will be used throughout the drawing(s) and accompanying written description to refer to the same or like parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

A retailer or a consultant to retailers (hereinafter referred to herein as "market analysts") may choose to remove certain products from one or more shelves or aisles to avoid cannibalistic effects. In other examples, aggregate volumes of total sales, including the product of interest and one or more competitive products, improve based on the arrangement of the products displayed in the aisle (e.g., displayed on a shelf of the aisle). Thus, the market analyst is typically concerned with creating an assortment of products that reduces cross product cannibalization while increasing aggregate sales of products.

Attempts to introduce a new product to an existing shelf in an aisle of a retailer may be met with resistance by the retailer based on, in part, a concern that any new product may have an adverse effect on adjacent products on the shelf and, thus, reduce overall sales revenue. For example, consumer goods companies frequently attempt to introduce new products into the market but must negotiate with retailers to de-list (e.g., remove from store shelves) products (preferably of competitors) to make room for the new product(s). Absent reliable data and/or predictions of performance for the new product, the retailer may be unwilling to accept a new product. The decisions regarding which products to adjust for shelf allocation, such as de-listing and/or shelf space adjustment(s), translate into improved or diminished sales profits and/or revenue performance for the retailer. Unfortunately, in the event the decision to de-list a product or adjust a shelf allocation results in poor sales for the new product or one or more adjacent products, the diminished aggregate sales may remain for an extended time period. Thus, it is important to accurately predict the success or failure of new product(s) and the impact such new product(s) will have on other product(s).

In examples disclosed herein, a product and/or a set of products may fall under any number of "categories", meaning the product and/or set of products may be characterized by any number of (shared) attributes. For example, a particular juice product may fall under categories such as "flavor", "brand", "manufacturer", "size", etc., along with other similar juice products. Product hierarchy trees provide useful visualizations of cross-category impacts of products on each other and can be used to provide responses to client inquiries regarding inter-product impacts. For example, a given product hierarchy tree may show an impact that a brand of the particular juice product may have on a flavor category of the same juice product, providing useful information which may be used by retailers to improve sales of the juice product. In examples disclosed herein, a given category may include any number of sub-categories, further indicating attributes of any number of products that may fall under the category.

Current approaches to product assortment methodologies rely on use of a single product hierarchy tree for analysis. These approaches often introduce different types of error (e.g., bias) into product assortment analyses and may additionally lend inflexibility in perspective for product interaction analysis. For example, if a product hierarchy were to be created based on a "sports drink" category, the accompanying product hierarchy tree may be arranged in the order "brand," "count," and "flavor" as example cascading sub-categories (e.g., with "brand" being a subcategory of "sports drink", "count" being a subcategory of "brand", and "flavor" being a subcategory of "count"). With this example hierarchy, analysis can be performed to suggest how brand affects the overall sports drink category, but it will remain unclear how flavor affects the sports drink category, due to the arrangement of the product hierarchy tree.

Thus, resulting analysis and/or answers to business issues (e.g., determining how to improve sales of a given product category, deciding how best to arrange a store shelf, etc.) are product hierarchy-dependent and cannot be adequately generalized. Furthermore, approaches in which all permutations of product assortment hierarchy trees are generated for analysis and/or response to client queries are extremely time and/or resource intensive, proving unfavorable for performing analyses on high volumes of data. In some examples, these traditional approaches result in market analyst discretion and/or retailer discretion when deciding which products to alter (e.g., de-list) on a shelf (if any). Because market analyst and/or retailer discretion may not be based on objective information that proves indications of success or failure in the decision making process, erroneous results occur that cause inefficiency and waste.

Example methods and apparatus disclosed herein utilize multiple product hierarchies to debias and enable flexibility in addressing business issues (e.g., determining how to improve sales of a given product category, deciding how best to arrange a store shelf, etc.). These multiple product hierarchies represent different views (e.g., hierarchies with different orders/permutations of product groupings in various categories and/or sub-categories) to allow for deeper analysis of cross-category impacts. The multiple views are combined into a single set of coefficients and/or impact values (e.g., using linear regression methods, etc.), thus making the resulting analysis and/or answers to business issues and/or inquiries independent of specific product hierarchy configurations, which is useful for the practical application of product impact analysis from any possible viewpoint.

FIG. 1 depicts an example dataset 100 from which a baseline hierarchy and/or a set of baseline hierarchies may be constructed (e.g., example baseline product hierarchy 200 explained further in conjunction with FIG. 2). In examples disclosed herein, a baseline product hierarchy is a product hierarchy that may be programmatically generated (e.g., using attribute collapsing algorithms) to represent a given viewpoint of a product and its given categories and/or sub-categories. For example, a baseline product hierarchy and/or a set of baseline product hierarchies may be generated based on pre-established groupings of products in various configurations or permutations to represent a product from different viewpoints (e.g., a single viewpoint indicates a single grouping configuration of products). In examples disclosed herein, six baseline product hierarchies are generated using the example dataset 100, however, any number of baseline product hierarchy may be generated from a given dataset (e.g., dataset 100) in other examples. In examples disclosed herein, six baseline product hierarchies are generated based on empirical data indicating diminishing returns in view of resource use when any more baseline product hierarchies are generated, and the same empirical data indicating a loss in efficiency when any less baseline product hierarchies were generated.

The example dataset 100 includes observation number values 102, product node values 104, sales instances 106, number of my items 108, number of competitive items 110, and Total Impact (TI) values 112. In examples disclosed herein, the observation number values 102 may correspond to a store observation, sales observation, etc. from which information corresponding to product hierarchy formation may be found. For example, these observation number values 102 may further indicate a list of categories and/or subcategories under which any given product may fall, providing possible configurations and/or permutations of groupings for generation of the six baseline product hierarchies (e.g., baseline product hierarchy 200 explained further in conjunction with FIG. 2). The example product node values 104 include, in examples disclosed herein, a description of the type of product being observed (e.g., based on manufacturer, brand, UPC number), as it relates to an overall category of products. In examples disclosed herein, UPC stands for "Universal Product Code," which is a unique set of numbers that represents a unique product. For example, in the example dataset 100, the product node values 104 are listed as 1, which means all observed products are of the same product node type (e.g., a pre-specified type 1) and can be arranged together in a product hierarchy for comparison. That is, for example, the type of product may refer to a particular analysis combination of a particular quantity of manufacturing types, a particular quantity of brands, and a particular quantity of UPCs. In the example of FIG. 1, the product node value 104 of 1 indicates a pre-specified type of product with three different manufacturing types, three different brands, and three UPCs per brand.

The example sales instances 106 indicate a number of sales instances and/or events that are associated with each entry (e.g., with each of the observation number values 102). For example, a sales instance 106 of 1044 indicates 1044 sales events/instances/occurrences associated with that given entry. The example number of my items 108 represents the number of "friendly" items (e.g., the number of items that will help increase the number of sales instances 106 associated with that particular entry and/or product). That is, the number of that type of particular product. Similarly, the example number of competitive items 110 indicates a number of competitive products that currently exist on the shelf for each of the observation number values 102 (e.g., the number of items that will decrease the number of sales instances associated with that particular entry and/or product).

The example Total Impact (TI) values 112 indicate an effect on the sales instances 106, per each added item to the number of my items 108, to an overall category of products. For example, a Total Impact (TI) value 112 of 20 associated with a product would indicate 20 added sales (e.g., sales instances 206) to a preceding category and/or subcategory under which the given product falls. In examples disclosed herein, a negative Total Impact (TI) value 112 would indicate a loss of sales (e.g., to another category) for each of the given products added to shelves. For example, a total Impact (TI) value 112 of −6 associated with a product would indicate 6 sales (e.g., sales instances 106) lost from a preceding category and/or subcategory of the product to another category and/or subcategory (e.g., transferred to another sibling category, transferred to a competitive category, etc.). That is, for example, if a given toothpaste product that falls under a "Crest" brand category were to have a negative Total Impact (TI) value 112, for each additional toothpaste product added to a retail shelf, the "Crest" brand category may lose sales to another brand category (e.g., "Colgate"). Similarly, if the toothpaste product that falls under the "Crest" brand category were to have a negative Total Impact (TI) value 112, the "Crest" brand category would increase sales for each additional toothpaste product added to the retail shelf. In application, for example, a less expensive product added within a brand category may "steal" sales from a more expensive product within the same brand category, indicating a negative Total Impact (TI) value 112 assigned to the less expensive product.

FIG. 2 illustrates an example baseline product hierarchy 200 generated using the example dataset 100 of FIG. 1, in accordance with the teachings of this disclosure. The example baseline product hierarchy 200 includes an example category 202 (e.g., an overall category such as "sports drink", "tennis shoes", etc.), an example first manufacturer category 204A, an example second manufacturer category 204B, an example third manufacturer category 204C, an example first brand category 206A, an example second brand category 206B, and an example third brand category 206C. As explained above in conjunction with FIG. 1, the type of product given by the product node values 104 of FIG. 1 may refer to a particular analysis combination of a particular quantity of manufacturing types, a particular quantity of brands, and a particular quantity of UPCs. In the example of FIG. 1, the product node value 104 of 1 indicates a pre-specified type of product with three different manufacturing types (e.g., the first manufacturer category 204A, the second manufacturer category 204B, and the third manufacturer category 204C), three different brands (e.g., the first brand category 206A, the second brand category 206B, and the third brand category 206C), and three SKUs per brand. Therefore, in the example of FIG. 2, the configuration of the example baseline product hierarchy 200 represents a single arrangement permutation of the various categories and/or sub-categories.

In the example of the baseline product hierarchy 200, the category 202 may represent, for example, any category of product that may contain a number of sub-categories of manufacturer types (e.g., the first manufacturer category 204A, the second manufacturer category 204B, and the third manufacturer category 204C) and brand types (e.g., the first brand category 206A, the second brand category 206B, and the third brand category 206C). In the particular configuration (e.g., arrangement permutation) of the baseline product hierarchy 200, the manufacturer type sub-categories (e.g., the first manufacturer category 204A, the second manufacturer category 204B, and the third manufacturer category 204C) are arranged on top of the brand type sub-categories (e.g., the first brand category 206A, the second brand category 206B, and the third brand category 206C). Therefore, the configuration and/or view of the baseline product hierarchy 200 provides categorical impact information of product brand type, relative to manufacturer type. The baseline product hierarchy 200 represents a single example of product configuration from the example dataset 100 of FIG. 1, however, any other type of configuration may be represented in any of the (six) baseline product hierarchies generated from the dataset 100.

An example categorical impact table 208 associated with the baseline product hierarchy 200 demonstrates a relationship between the Total Impact (TI) value 112 and an example Direct Impact (DI) value 210 and an example Cross Impact (CI) value 212. In examples disclosed herein, the example Direct Impact (DI) value 210 represents an addition of sales (e.g., addition of sales instances 106) to a preceding category and/or sub-category of a particular product when one more of that product is added (e.g., to a store shelf). In examples disclosed herein, the example Cross Impact (CI) value 212 represents a loss of sales (e.g., loss of sales instances 106) to a competitive category and/or sub-category for every added product. Therefore, in examples disclosed herein, the Total Impact (TI) value 112 is a summation of both the Direct Impact (DI) value 210 and the Cross Impact (CI) value 212. In the particular example of the categorical impact table 208, the Total Impact (TI) value 112 of 16, the Direct Impact (DI) value 210 of 20, and the Cross Impact (CI) value 212 of −4 represent impact statistics for the example first manufacturer category 204A. Each of the other categories and/or subcategories in the baseline product hierarchy 200 (e.g., the category 202, the second manufacturer category 204B, the third manufacturer category 204C, the first brand category 206A, the second brand category 206B, and the third brand category 206C) will each have their respective Total Impact (TI) value 112, Direct Impact (DI) value 210, and Cross Impact (CI) value 212.

In examples disclosed herein, impact values (e.g., TI value 112, DI value 210, and CI value 212) listed in the categorical impact table 208 for the first manufacturer category 204A are imputed across all child nodes of the first manufacturer category 204A (e.g., the first brand category 206A, the second brand category 206B, and the third brand category 206C). For example, in examples disclosed herein, Cross Impact (CI) values 212 and/or Direct Impact (DI) values 210 may be extracted from historical sales data and/or may be provided as part of the example dataset 100 of FIG. 1. In examples in which the CI values 212 and/or DI values 210 are extracted from historical sales data, an average number of sales per product for a particular product may be calculated from the historical sales data to represent the DI value 210 for a given child node (e.g., the first brand category 206A, the second brand category 206B, and the third brand category 206C). In examples in which any combination of the DI value 210, CI value 212, and/or TI value 112 is provided for a given node (e.g., category or subcategory) of the baseline product hierarchy 200 are not provided in the dataset 100 of FIG. 1, the missing value(s) may be determined by applying historical sales data, applying the principles of the relationship between each of the values (e.g., the TI value 112=the DI value 210+the CI value 212), etc.

In examples disclosed herein, it must hold that the Direct Impact (DI) value 210 of the parent node (e.g., the first manufacturer category 204A) is greater than or equal to the minimum Total Impact (TI) value 112 and is less than or equal to the maximum Total Impact (TI) value 112 of any of its child nodes (e.g., the first brand category 206A, the second brand category 206B, and/or the third brand category 206C). In practical application, this ground-truth relationship indicates that an impact a parent node and/or category has on itself (e.g., Direct Impact (DI) value 210) cannot fall outside the bounds of an overall impact (e.g., Total Impact (TI) value 112) of a child node and/or product to its preceding category and/or subcategory (e.g., parent node). That is, for example, with the child nodes of the first brand category 206A, the second brand category 206B, and the third brand category 206C have a minimum TI value 112 of −1 and a maximum TI value 112 of 24. In the baseline product hierarchy 200, the DI value 210 of the parent category (e.g., the first manufacturer category 204A) is 20 (as shown in the categorical impact table 208). Therefore, in the example of FIG. 2, this fundamental relationship holds, rendering the example baseline product hierarchy 200 a valid baseline hierarchy for use in UPC interaction and/or cannibalization calculation.

Figure 3:
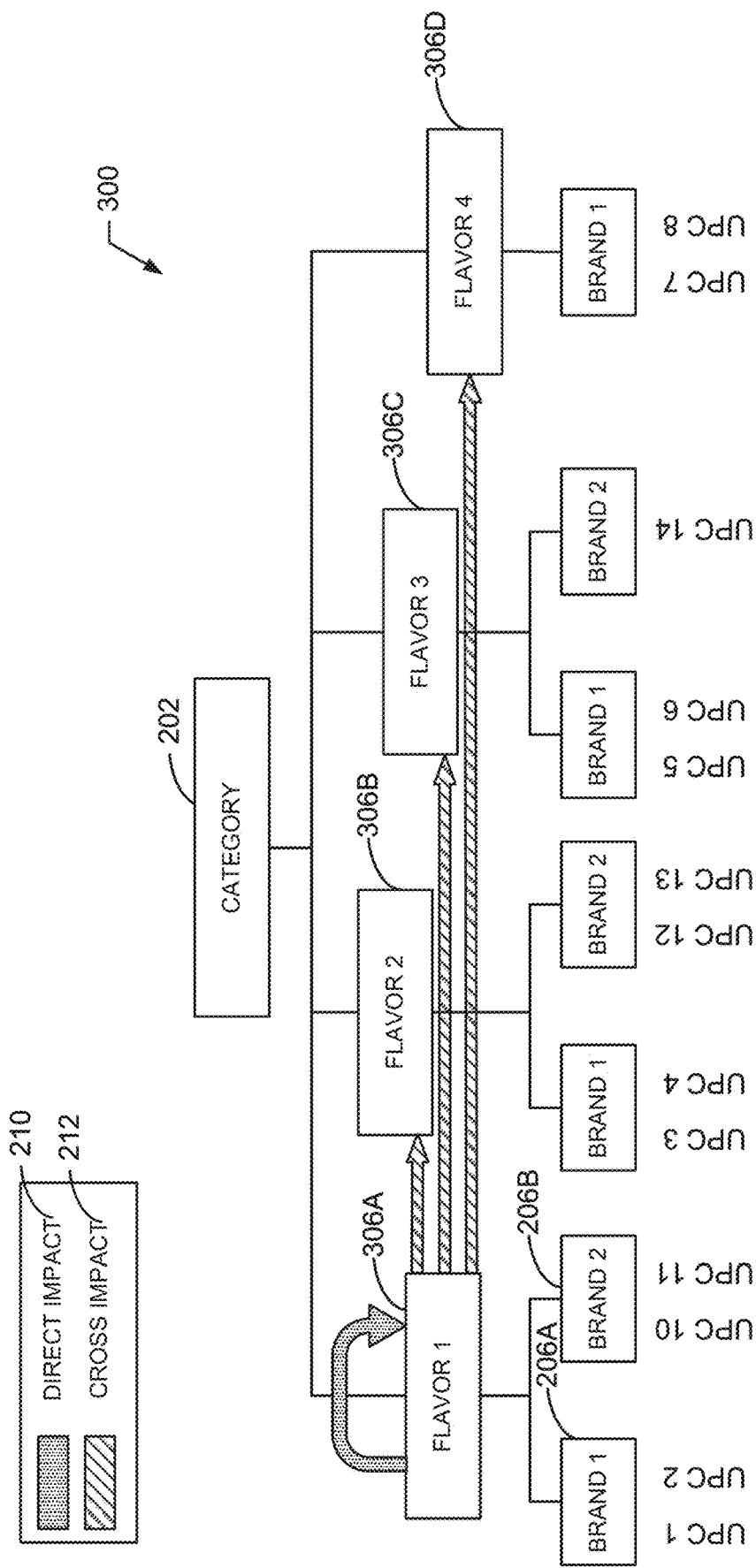
FIG. 3 illustrates an example first product hierarchy in which direct impact and cross impact between sibling nodes is depicted.

FIG. 3 illustrates an example first product hierarchy 300 in which example Direct Impact (DI) values 210 and example Cross Impact (CI) values 212 between sibling nodes is visualized. In examples disclosed herein, "sibling nodes" may be defined as any related nodes (e.g., corresponding to different type of flavor, different types of brands, etc.) that stem from a common parent node. In the example first product hierarchy 300 of FIG. 3 an example first flavor category 306A, an example second flavor category 306B, an example third flavor category 306C, and an example fourth flavor category 306D are all sibling nodes under the (same) category 202 (e.g., the same parent category). Similarly, for each of the flavor categories (e.g., the first flavor category 306A, the second flavor category 306B, the third flavor category 306C, and the fourth flavor category 306D), there are two sibling categories that fall under (e.g., the first brand category 206A and the second brand category 206B).

A depiction of direct impact (e.g., DI value 210) is shown by way of an arrow pointing from the first flavor category 306A, back to itself. As defined hereinabove, direct impact represents an impact a product, category, and/or subcategory has on itself. More particularly, the DI value 210 is quantified by a number of sales (e.g., sales instances 106 of FIG. 1) added to a given category and/or subcategory when one more of a product within that category and/or subcategory is added (e.g., to a store shelf). As represented by the arrow pointing to the first flavor category 306A in the first product hierarchy 300, direct impact (e.g., the DI value 210) is a quantified effect of a category and/or subcategory on itself.

Cross impact (e.g., CI value 212) is visualized in the example of FIG. 3 as a series of arrows pointing from the first flavor category 306A to its fellow sibling categories (e.g., the second flavor category 306B, the third flavor category 306C, and the fourth flavor category 306D). As defined hereinabove, cross impact represents an impact a product, category, and/or subcategory has on its sibling categories. More particularly, the CI value 213 is quantified by a number of sales (e.g., sales instances 106 of FIG. 1) lost from a given category and/or subcategory to a sibling category and/or subcategory when one more of a product within that category and/or subcategory is added (e.g., to a store shelf). As represented by the series of arrows pointing to the first flavor category 306A in the first product hierarchy 300 to the second flavor category 306B, the third flavor category 306C, and the fourth flavor category 306D, cross impact (e.g., the CI value 212) is a quantified effect of a category and/or subcategory on its sibling categories.

Figure 4:
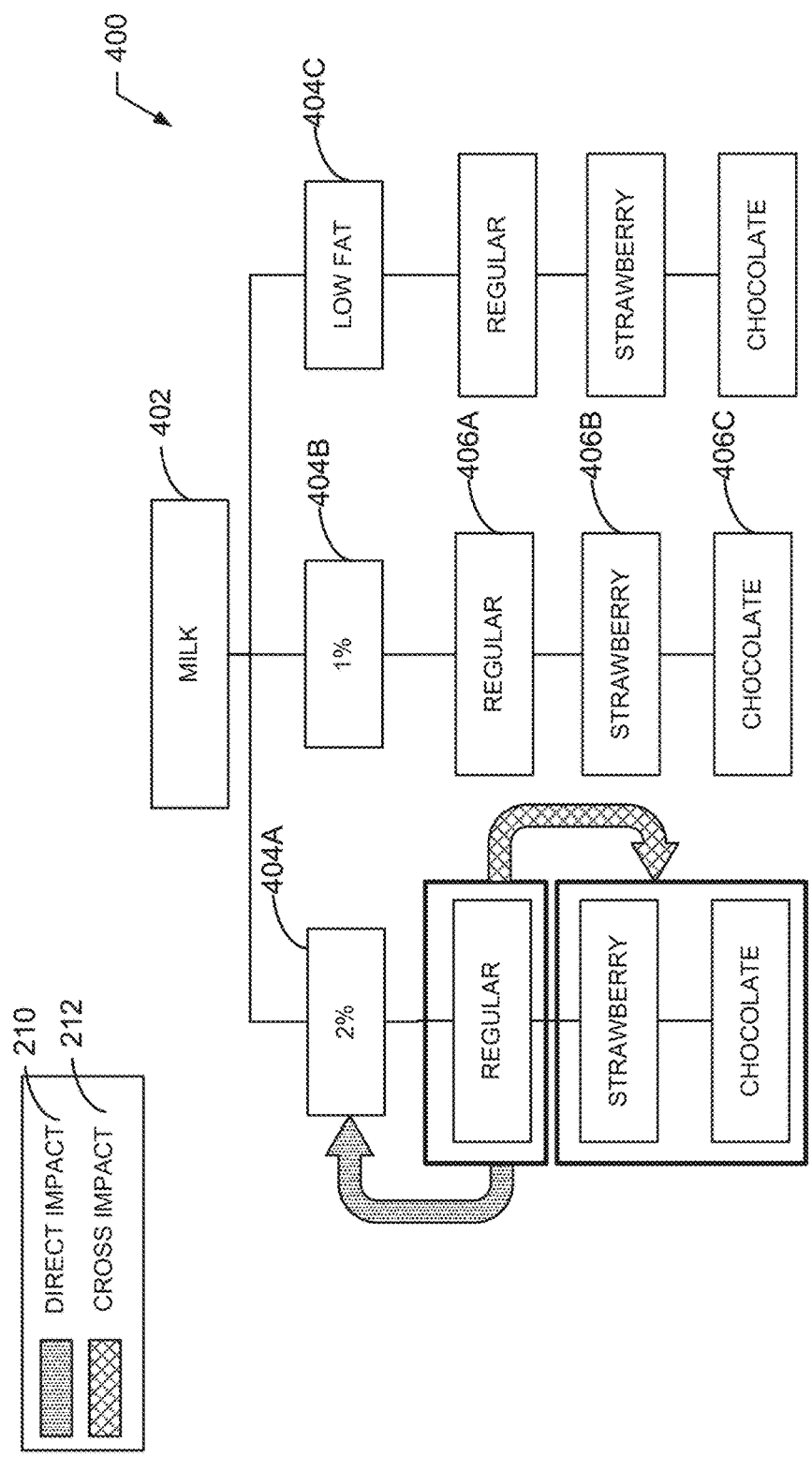
FIG. 4 illustrates an example second product hierarchy in which direct impact and cross impact between parent-child nodes is depicted.

FIG. 4 illustrates an example second product hierarchy 400 in which direct impact (e.g., DI value 210) and cross impact (e.g., CI value 212) between parent-child nodes is depicted. The example second hierarchy 400 includes an example milk category 402 as an overall category (e.g., category 105), with sub-sibling categories (e.g., subcategories) of 2% milk category 404A, 1% milk category 404B, and lowfat milk category 404C. Under each of these respective subcategories are three flavor categories (e.g., regular milk 406A, strawberry milk 406B, and chocolate milk 406C). In the example second product hierarchy 400, the effect that the regular milk 406A subcategory has on the preceding 2% milk category 404A is quantified and depicted in FIG. 4 as the direct impact (e.g., DI value 210). Similarly, the effect that the regular milk 406A subcategory has on its sibling categories, strawberry milk 406B and chocolate milk 406C, is quantified and depicted in FIG. 4 as the cross impact (e.g., CI value 212).

Figure 5:
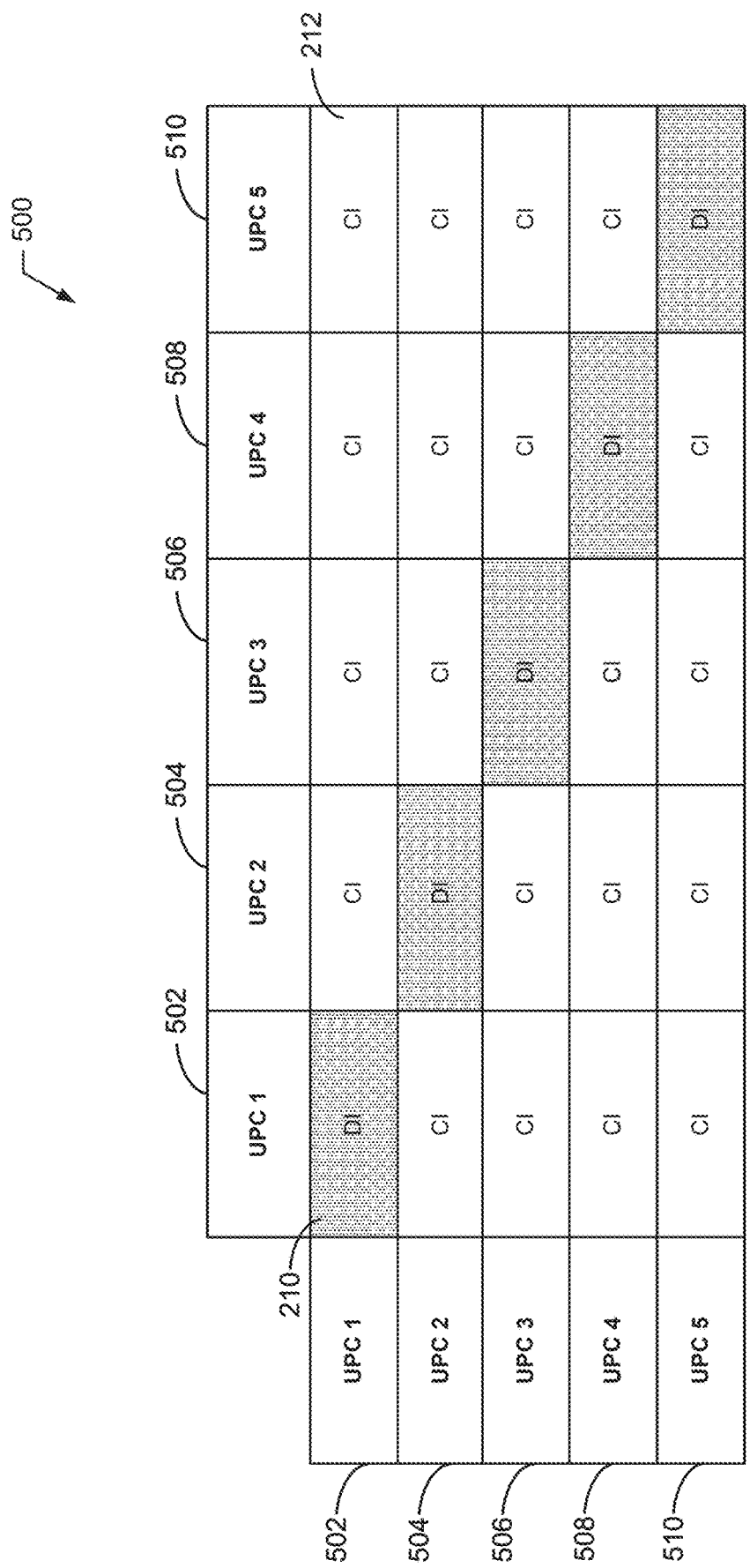
FIG. 5 depicts an example relationship matrix indicating an imputed set of impacts from one product to another in a product hierarchy tree.

FIG. 5 depicts an example relationship matrix 500 indicating an imputed set of impacts from one product to another in a given product hierarchy tree (e.g., baseline product hierarchy 200 of FIG. 2, first product hierarchy 300 of FIG. 3, and/or second product hierarchy 400 of FIG. 4). The example relationship matrix 500 includes an example first UPC 502, an example second UPC 504, an example third UPC 506, an example fourth UPC 508, and an example fifth UPC 510. The relationship matrix 500 depicts all permutations and/or combinations of UPC-UPC interactions in the given product hierarchy tree. In examples disclosed herein, an interaction (e.g., quantified by a CI value 212) between two different UPCs (e.g., between the first UPC 502 and the second UPC 504, between the second UPC 504 and the third UPC 506, etc.) may be determined through use of Equations 1 and/or 2, as shown below.

In examples disclosed herein, Equations 1 and/or 2 may be used to calculate the CI values 212 representing any given UPC-UPC interaction in a product hierarchy tree. In examples disclosed herein, Equation 1 may be used when the lowest level of the product hierarchy tree (e.g., the level of the product hierarchy tree containing UPCs) has been reached, and Equation 2 may be used when a given node still has child nodes to impute the corresponding CI value 212 across.

In Equations 1 and 2 shown below, $CI_{(hier,lev)}$ (i) represents the Cross Impact (CI) value 212 at a given first product position i (e.g., a first UPC in a UPC-UPC interaction) in the lowest level of a product hierarchy tree (e.g., the level of a product hierarchy tree containing UPCs within their respective categories and/or subcategories). As explained hereinabove, in examples disclosed herein, the CI value 212 of any given product may be obtained from a dataset (e.g., dataset 100 of FIG. 1), a database, etc. or calculated using the corresponding DI value 210 and/or TI value 112, among other ways. In examples disclosed herein, Sales (j) represents an average number of sales per week in a store of j (e.g., where j represents a second UPC in the UPC-UPC interaction being examined), as obtained in the example dataset 100 of FIG. 1. Sibling(j), in these examples represents a number of direct sibling nodes of j. In examples disclosed herein, $Parent_{(hier,lev)}$ (i) represents the parent node of the current product i at the current position in the product hierarchy tree lev for the current product hierarchy tree being examined hier. Additionally, ROS(i) represents an average number of sales (e.g., an average number of the sales instances 106 of FIG. 1) per item of i. In examples disclosed herein, the average number of sales (e.g., ROS(i)) may be calculated by adding together all sales instances 106 of i and dividing by the number of i items.

However, in examples disclosed herein, prior to calculation of the CI values 212 representing each UPC-UPC interaction, historical and/or aggregate sales data (e.g., sales instances 106 of FIG. 1) is used to weight each of the CI values 212, DI values 210, and/or TI values 112 associated with each individual UPC, in order to establish a weighted impact of each UPC. A weighted impact, in examples disclosed herein, contributes further to generating a specific product hierarchy view-independent set of statistics for each product. That is, for example, a product that contributes a higher number of sales (e.g., sales instances 106), relative to other products within a same category and/or subcategory, would thus have a corresponding higher impact to that category and/or subcategory. Therefore, the higher impact (e.g., relative to other "sibling" products within the same category and/or subcategory) in single product hierarchy view, in examples disclosed herein, would need to be taken into account when imputing UPC-UPC impact relationship values (e.g., CI values 212). For example, if a first UPC (e.g., UPC 1) had a higher sales-weighted impact (e.g., was determined to have a higher number of average sales per item, relative to its sibling products within the same category and/or subcategory) than a second UPC (e.g., UPC 2) had relative to its sibling products, the UPC1-UPC2 relationship value would demonstrate a higher CI values 212 than the UPC2-UPC1 relationship, since UPC 1 has a demonstrated higher impact. When blending together all imputed UPC-UPC interactions for each baseline product hierarchy (e.g., baseline product hierarchy 200 of FIG. 2) as a final stage in generating a hierarchy-independent set of impact values, the sales-weighted values provide a more accurate indication of average product importance, which can be applied to scenarios independent of the (six) baseline product hierarchies from which they were imputed.

In examples disclosed herein, Equations 3A and 3B represent the calculation of the weighting factor relative to sales (e.g., sales instances 106) that is applied to each product in a given product hierarchy tree (e.g., baseline product hierarchy 200 of FIG. 2). For each product, a determination is made (e.g., by example product assortment circuitry 700 explained further in conjunction with FIG. 7) as to whether the total impact (e.g., TI value 112) of a given product is greater than or equal to a direct impact (e.g., DI value 210) of its parent node. In examples disclosed herein, if the TI value 112 of the given product is determined (e.g., by the product assortment circuitry 700 of FIG. 7) to be greater than or equal to the DI value 210 of its parent node, a "high" weight (e.g., relative to sibling products within the same category and/or subcategory) is assigned to the product. In examples disclosed herein, when an individual product has a total impact (e.g., TI value 112) that is greater than or equal to a direct impact (e.g., DI value 210) of its parent node (e.g., category and/or subcategory), this indicates that the product has a greater impact on that overall category and/or subcategory than does the category on itself as a whole. Furthermore, in examples disclosed herein, it may hold that multiple (sibling) products within the same category and/or subcategory are determined to have a "high" weight.

Similarly, in examples disclosed herein, if the TI value 112 of the given product is determined (e.g., by the product assortment circuitry 700 of FIG. 7f) to be less than the DI value 210 of its parent node, a "low" weight (e.g., relative to sibling products within the same category and/or subcategory) is assigned to the product. In examples disclosed herein, when an individual product has a total impact (e.g., TI value 112) that is less than a direct impact (e.g., DI value 210) of its parent node (e.g., category and/or subcategory), this indicates that the product has a lesser impact on that overall category and/or subcategory than does the category on itself as a whole. Furthermore, in examples disclosed herein, it may hold that multiple (sibling) products within the same category and/or subcategory are determined to have a "low" weight.

$$WH_{(hier)}(k) := \frac{-SN_{(hier)}(k)}{(SP_{(hier)}(k) * CN_{(hier)}(k)) - (SP_{(hier)}(k) * CP_{(hier)}(k))}$$

Equation 3A $$WL_{(hier)}(k) := \frac{1 - WH_{(hier)}(k) * CP_{(hier)}(k)}{(CN_{(hier)}(k))}$$

Equation 3B

Figure 7:
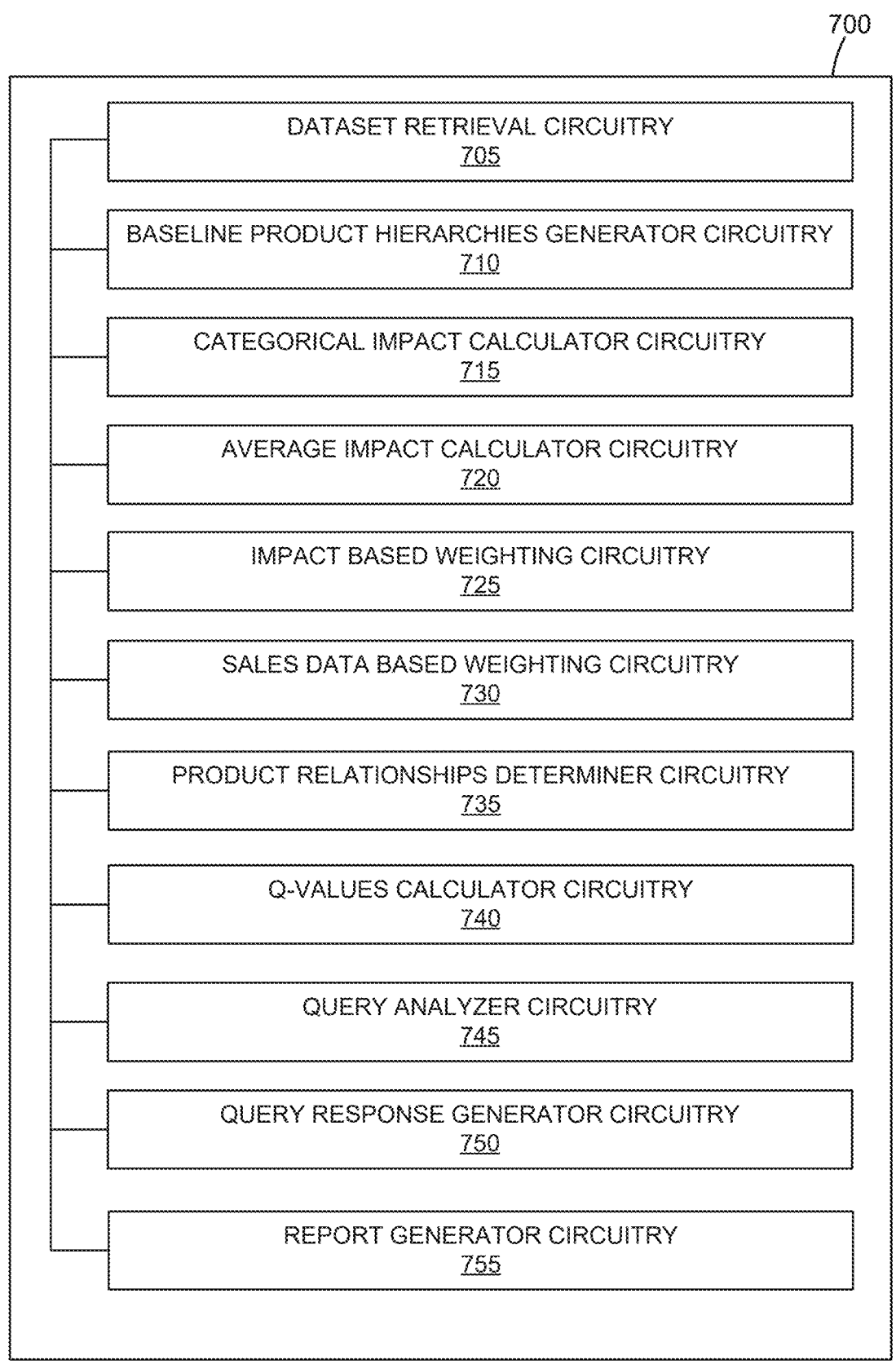
FIG. 7 is a block diagram of an example implementation of product assortment circuitry, in accordance with the teachings of this disclosure.

In the example Equations 3A and 3B, $WH_{(hier)}$ (k) represents the "high" weight calculation, and $WL_{(hier)}$(k) represents the "low" weight calculation after a determination is made (e.g., by the product assortment circuitry 700 explained further in conjunction with FIG. 7) as to which class of weight (e.g., "low" or "high") should be applied to each given node. In examples disclosed herein, $CN_{(hier)}$(k) represents a number of child nodes of the given node that have an associated TI value 112 that is less than the DI value 210 of the given (parent) node (e.g., a number of child nodes that have a "low" importance to the node being examined). $CP_{(hier)}$(k), on the other hand, represents a number of child nodes of the given node that have an associated TI value 112 that is greater than or equal to the DI value 210 of the given (parent) node (e.g., a number of child nodes that have a "high" importance to the node being examined), in examples disclosed herein.

$SP_{(hier)}(k)$, in examples disclosed herein, represents an aggregate number of sales (e.g., sales instances 106 of FIG. 1) of each child node that is determined (e.g., by the product assortment circuitry 700) to have a "high" importance to its parent node, and $SN_{(hier)}(k)$, in examples disclosed herein, represents an aggregate number of sales (e.g., sales instances 106 of FIG. 1) of each child node that is determined (e.g., by the product assortment circuitry 700 of FIG. 7) to have a "low" importance to its parent node.

In examples disclosed herein, once each individual weighting factor has been assigned (e.g., by the product assortment circuitry 700 explained further in conjunction with FIG. 7), Equations 4A-4C are used to calculate a summation of weights of each tier of a given product hierarchy tree (e.g., the baseline product hierarchy 200 of FIG. 2) in order to impute across all levels of the product hierarchy tree. For example, the summary weight is given by $\Sigma_{k\ in\ Parent_{(hier,lev)}} \text{diag}W_{(hier)}(k)$, in examples disclosed herein. This represents a summation of a set of weights for each of the imputed values.

$$\text{diag}W_{(hier)}(k) := \qquad \text{Equation 4A}$$

$$W_{(hier)}(k) * \frac{\text{Sales }(\text{Parent}_{(hier)}(k))}{\sum_{s\ in\ \text{Parent}_{(hier)}(k)}(\text{Sales}(S) * W_{(hier)}(S))}$$

$$W_{(hier)}(k) := WH_{(hier)}(\text{Parent}_{(hier)}(k)) \qquad \text{Equation 4B}$$

$$W_{(hier)}(k) := WL_{(hier)}(\text{Parent}_{(hier)}(k)) \qquad \text{Equation 4C}$$

Using Equations 3A and/or 3B, $\text{diag}W_{(hier)}(i)$ represents the product importance calculation, weighted relative to aggregate sales data (e.g., sales instances 106 of FIG. 1). In examples disclosed herein, the weights may be any integer greater than zero and less than or equal to one, however, any other type of weighting system may be used in other examples.

In examples disclosed herein, in addition to weighting by confidence levels and/or historical sales data, further special values (e.g., weighting factors) may be used to de-bias and/or mitigate a confounding nature of sales statistics (e.g., sales instances 106 of FIG. 1), based on external factors. For example, a geographical weighting factor may need to be held into account when observing, collecting, and/or applying sales data (e.g., sales instances 106 of FIG. 1) for certain products. That is, for example, some soft drink products, such as Coke, tend to have higher number of sales in the Southern region of the United States, as opposed to other regions of the country, through factors outside the realm of standard product cannibalization and store shelf organization theories. Additionally, especially on an international scale, regional preferences must be taken into account in order to provide a de-biased set of data for analysis and/or blending. Therefore, in examples disclosed herein, an additional set of special values may be used in order to further de-bias any external factors such as these through an additional weighting system. In examples disclosed herein, these special values may be provided via a client database, a retail database, etc., however, any other method of provision may be used to obtain these additional de-biasing values.

Upon calculation of the product importance weight for each node (e.g., by the product assortment circuitry 700 of FIG. 7), Equations 1 and/or 2 are used, in examples disclosed herein, in order to calculate the CI value 212 that represents each UPC-UPC interaction for a given product hierarchy, as weighted by both sales data and product importance.

$$CI_{(hier)}(i,j) := CI_{(hier,lev)}(i) * \frac{\text{Sales}(j)}{\text{Sibling}(j)} \qquad \text{Equation 1}$$

$$CI_{(hier)}(i,j) := (CI_{(hier,lev)}(i)) * \frac{\text{Sales}(j)}{\text{Sibling}(\text{Parent}_{(hier,lev)}(i))} * \qquad \text{Equation 2}$$

$$\frac{sqrt(ROS(i)) * \sum_{k\ in\ \text{Parent}_{(hier,lev)}(i)} \text{diag}W_{(hier)}(k)}{\sum_{k\ in\ \text{Parent}_{(hier,lev)}(i)} \text{diag}W_{(hier)}(k) * sqrt(ROS(k))}$$

In examples disclosed herein, the $CI_{(hier)}(i,j)$ value represents the CI value 212 of a given UPC-UPC interaction (e.g., an i-j interaction), which is then used to populate the example relationship matrix of FIG. 5. That is, for example, a $CI_{(hier)}$(UPC 1, UPC 2) value would be stored at the position at which the first UPC 502 and the second UPC 504 intersect. However, in these examples, a UPC1-UPC2 interaction often may not yield the same result (e.g., CI value 212) as a UPC2-UPC1 interaction. Therefore, an ordering of UPCs is relevant to the impact value calculated therefrom, and the resulting values are stored in their respective separate positions in the relationship matrix 500.

The example relationship matrix 500 further includes a diagonal of Direct Impact (DI) values 210, which represent the positions at which a relationship of a given UPC is examined against itself. For example, a UPC1-UPC1 interaction would be represented as the DI value 210 assigned to UPC 1 in the corresponding position in the relationship matrix 500.

In examples disclosed herein, the relationship matrix 500 represents a set of UPC-UPC interactions calculated for a given product hierarchy tree (e.g., a single view). In these examples, since multiple (e.g., six) baseline product hierarchies (e.g., baseline product hierarchy 200 of FIG. 2) are generated from a given dataset (e.g., dataset 100 of FIG. 1), multiple (e.g., six) relationship matrices (e.g., relationship matrix 500) are formed accordingly. Each of these matrices will represent different values for the same set of UPCs, since the UPCs will be arranged in various configurations and/or permutations.

Furthermore, in examples disclosed herein, a Q-value (e.g., confidence level) may be associated with each of the CI values 212 in the relationship matrix 500, representing a confidence level associated with each of the imputed and/or calculated values. In practice, these confidence levels (e.g., Q-values) associated with each of the CI values 212 are helpful in providing a certainty measure along with a query response, for consideration by clients, retailers, manufacturers, etc. when implementing new and/or updated business practices, for example. For example, a relationship value with a lower associated Q-value (e.g., relative to other calculated Q-values) representing a particular product interaction may carry less importance to a retailer than a relationship value with a higher associated Q-value. That is, for example, if a retailer were to make a decision regarding rearrangement of store shelves based on a calculated set of relationship values, he/she may take into consideration the associated Q-values when prioritizing arrangement of certain products. In examples disclosed herein, the confidence metric (e.g., Q-value) for a given relationship value (e.g., representing a particular UPC-UPC interaction) may be compared against a (e.g., minimum) threshold confidence level (e.g., threshold confidence metric) to determine whether the relationship value should be considered. For example, if the threshold confidence level is satisfied, the retailer would make a rearrangement to store shelves using and/or based on the indicated relationship value. That is, the threshold confidence level would indicate, if satisfied, a high (e.g., minimum acceptable) level of confidence associated with a relationship value.

Furthermore, in examples disclosed herein, weighting each node by confidence level (e.g., its associated Q-value) avoids and/or otherwise reduces re-computation efforts that are required by traditional approaches when threshold confidence metric values are not satisfied. For example, in other approaches, if a Q-value associated with a particular relationship value (e.g., representing a UPC-UPC interaction) does not satisfy the indicated threshold confidence metric, the relationship value would need to be re-calculated using a different product hierarchy view (e.g., a different viewpoint) to provide a higher level of confidence in the relationship value. By weighting each node by confidence level to generate an aggregate blended relationship value (e.g., using different product hierarchy views) for each UPC-UPC interaction further reduces (e.g., minimizes) this re-computation effort by minimizing the number of Q-values (e.g., relationship values) that do not pass the threshold confidence metric. Therefore, this improves the ability for computational tools to satisfy green energy initiatives mandated by various jurisdictions due to a reduction in overall energy and/or resource expenditure (e.g., by reducing and/or avoiding re-computation of values, etc.).

In examples disclosed herein, each Q-value associated with each CI value 212 in each relationship matrix (e.g., relationship matrix 500) may be calculated using example Equations 5A and/or 5B (shown below).

$$Q_{(hier)}(j, i) := \frac{-CI_{(hier)}(i, j)}{ROS(i)} \quad \text{Equation 5A}$$

$$Q_{(hier)}(i) := \frac{-DI_{(hier)}(i)}{ROS(i)} \quad \text{Equation 5B}$$

In examples disclosed herein, Equation 5A is used when i is not equal to j (e.g., when two different nodes and/or UPCs are being examined), and Equation 5B is used when i is equal to j. As explained hereinabove, ROS(i) represents an average number of sales per item of i.

Figure 6:
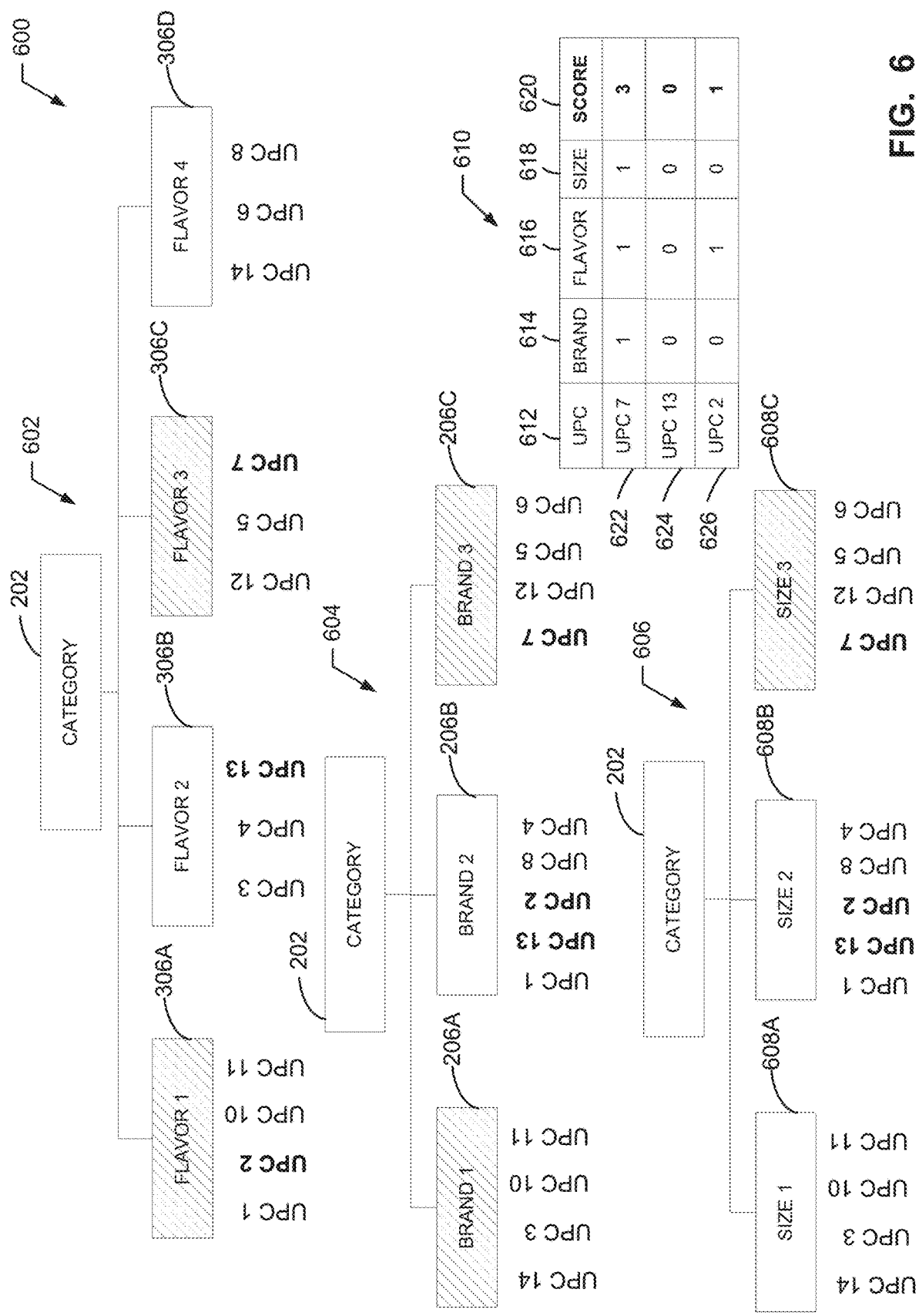
FIG. 6 illustrates an example baseline product hierarchy framework structured in accordance with the teachings of this disclosure to generate product hierarchies to represent different product viewpoints for blending.

FIG. 6 illustrates an example baseline product hierarchy framework 600, in accordance with the teachings of this disclosure, in which multiple baseline product hierarchies (e.g., baseline product hierarchy 200 of FIG. 2) are depicted, representing different viewpoints for aggregate analysis. An example first view 605 contains the category 202 (e.g., of FIG. 2), and sub-categories related to flavor (e.g., the first flavor category 306A, the second flavor category 306B, the third flavor category 306C, and the fourth flavor category 306D of FIG. 3). In examples disclosed herein, the category 202 may represent "soft drinks", "juice", "ice cream", etc. The example first view 602 further includes a number of Universal Product Codes (hereinafter and/or hereinabove referred to as "UPCs") listed under each of the first flavor category 306A, the second flavor category 306B, the third flavor category 306C, and/or the fourth flavor category 306D. Each of these UPCs represent a particular product that may be characterized under the given category (e.g., category 202) and/or the given sub-category (e.g., the first flavor category 306A, the second flavor category 306B, the third flavor category 306C, and/or the fourth flavor category 306D). For example, an example UPC of "012345678912" may indicate a particular orange-flavored sports drink product (e.g., a product that falls under the exemplary category 202 defined as "sports drink" and that falls under the exemplary first flavor category 306A defined to be "orange"). Furthermore, in examples disclosed herein, any category and/or sub-category may include any number of UPCs contained within. For example, in the first view 602, the first flavor category 306A contains four UPCs, and the second flavor category 306B, the third flavor category 306C, and the fourth flavor category 306D include three UPCs each. Each UPC (e.g., UPC 1, UPC 2, UPC 3, etc.) indicates a different product that falls under its given category and/or sub-category.

An example second view 604 contains the (same) category 202, and sub-categories related to brand (e.g., the first brand category 206A, the second brand category 206B, and the third brand category 206C of FIG. 3). Similar to the example first view 602, the second view 604 depicts a number of UPCs contained within each of the given sub-categories (e.g., the first brand category 306A, the second brand category 306B, and/or the third brand category 306C). An example third view 606 contains the (same) category 202, and sub-categories related to size (e.g., an example first size category 608A, an example second size category 608B, and an example third size category 608C), with each of these size-related sub-categories further including a number of UPCs contained within.

The example baseline product hierarchy framework 600 further includes an example product importance representation table 610, which provides a quantified visualization of product importance, as explained hereinabove in conjunction with FIG. 5. In the illustrated example of FIG. 6, the product importance representation table 610 includes an example UPC column 612, an example brand column 614, an example flavor column 616, an example size column 618, and a score (e.g., impact score) column 620.

In the illustrated example of FIG. 6, the example first flavor category 306A, the example third flavor category 306C, the example first brand category 206A, the example third brand category 206C, and the example third size category 608C are designated (e.g., by the product assortment circuitry 700 of FIG. 7) as nodes of "high" importance to their respective parent node (e.g., the (same) category 202). That is, in accordance with the explanation hereinabove in conjunction with FIG. 5, each of these child nodes (e.g., the example first flavor category 306A, the example third flavor category 306C, the example first brand category 206A, the example third brand category 206C, and the example third size category 608C) have a determined TI value 112 that is greater than or equal to the DI value 210 of their respective parent nodes (e.g., the (same) category 202). The example second flavor category 306B, the example fourth flavor category 306D, the example second brand category 206B, the example first size category 608A, and the example second size category 608B are designated (e.g., by the product assortment circuitry 700 explained further in conjunction with FIG. 7)

In the example product importance representation table 610, the child nodes (e.g., a selected few shown in the UPC column 612) that fall under the parent categories assigned a "high" importance (e.g., the example first flavor category 306A, the example third flavor category 306C, the example first brand category 206A, the example third brand category 206C, and the example third size category 608C) are represented as a "1" under the respective "high importance" categories in the product importance representation table 610. For example, UPC 7 is represented as an example high importance UPC 622 in the product importance representation table 610. That is, UPC 7 (e.g., the high importance UPC 622) falls under (e.g., is characterized under) each of the first flavor category 306A, the third flavor category 306C, the first brand category 206A, the third brand category 206C, and the third 608C, which are all designated (e.g., by the product assortment circuitry 700) "high importance" nodes. In examples disclosed herein, and as explained hereinabove in conjunction with FIG. 5, the importance level (e.g., weight) of a parent category is imputed across its child nodes, therefore, a high importance score of "1" is assigned (e.g., by the product assortment circuitry 700) for the high importance UPC 622 under each of the brand column 614, the flavor column 616, and the size column 618, adding up to an aggregate importance score of "3", as represented in the score column 620.

Similarly, in the example product importance representation table 610, the child nodes (e.g., a selected few shown in the UPC column 612) that fall under the parent categories assigned a "low" importance (e.g., the example second flavor category 306B, the example fourth flavor category 306D, the example second brand category 206B, the example first size category 608A, and the example second size category 608B) are represented as a "0" under the respective "low importance" categories in the product importance representation table 610. For example, UPC 13 is represented as an example low importance UPC 624 in the product importance representation table 610. That is, UPC 13 (e.g., the low importance UPC 624) falls under (e.g., is characterized under) each of the example second flavor category 306B, the example fourth flavor category 306D, the example second brand category 206B, the example first size category 608A, and the example second size category 608B, which are all designated (e.g., by the product assortment circuitry 700) "low importance" nodes. In examples disclosed herein, and as explained hereinabove in conjunction with FIG. 5, the importance level (e.g., weight) of a parent category is imputed across its child nodes, therefore, a low importance score of "0" is assigned (e.g., by the product assortment circuitry 700) for the low importance UPC 624 under each of the brand column 614, the flavor column 616, and the size column 618, adding up to an aggregate importance score of "0", as represented in the score column 620.

In the example baseline product hierarchy framework 600 of FIG. 6, UPC 2 is represented as an example low importance UPC 624 in the product importance representation table 610. The low importance UPC 624 falls under a combination of "high importance" (e.g., the first flavor category 306A, and the second size category 608B) and "low importance" (e.g., the second brand category 206B) parent nodes, indicating a mixed importance value. For example, under the brand column 614, an importance score of "0" is assigned to the mixed importance UPC 626 (e.g., by the product assortment circuitry 700 of FIG. 7), under the flavor column 616, an importance score of "1" is assigned, and under the size column 618, an importance score of "0" is assigned, giving the mixed importance UPC 626 (e.g., UPC 2) an aggregate importance score of "1" shown in the score column 620 of the product importance representation table 610.

The score column 620, in the illustrated example of FIG. 6 demonstrates the concept of imputed importance of "high" impact and "low" impact categories across child nodes, as represented by the calculation of product importance weights for each node in a given product importance tree (e.g., as explained hereinabove in conjunction with FIG. 5). That is, for each UPC that more frequently falls under (e.g., is characterized under) "high importance" parent nodes (e.g., as indicated by the DI value 210, the CI value 212, the TI value 112, etc.), the UPC has a higher general impact. For example, in the illustrated example of FIG. 6, the high importance UPC 622 has the highest overall importance score of "3" of its fellow UPCs (e.g., the low importance UPC 624 and the mixed importance UPC 626), showing how importance levels (e.g., as indicated by importance weights) of parent nodes are imputed across their respective child nodes. Following the same concept, the low importance UPC 624 has the lowest score of "0" in the score column 620, and the mixed importance UPC 626 has a middle-value score of "1" in the score column 620. Thus, weighting by product importance allows for a more efficient and/or accurate representation of overall product importance, across many (e.g., all) permutations and/or combinations of product hierarchy arrangements.

FIG. 7 is a block diagram of example product assortment circuitry 700 to perform product relationship and/or importance determination. The product assortment circuitry 700 of FIG. 7 may be instantiated (e.g., creating an instance of, bring into being for any length of time, materialize, implement, etc.) by processor circuitry such as a central processing unit executing instructions. Additionally or alternatively, the product assortment circuitry 700 of FIG. 7 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 7 may, thus, be instantiated at the same or different times. Some or all of the circuitry may be instantiated, for example, in one or more threads executing concurrently on hardware and/or in series on hardware. Moreover, in some examples, some or all of the circuitry of FIG. 7 may be implemented by microprocessor circuitry executing instructions to implement one or more virtual machines and/or containers.

In the illustrated example of FIG. 7, the product assortment circuitry 700 includes example dataset retrieval circuitry 705, example baseline product hierarchies generator circuitry 710, example categorical impact calculator circuitry 715, example average impact calculator circuitry 720, example average impact based weighting circuitry 725, example sales data based weighting circuitry 730, example product relationships determiner circuitry 735, example Q-values calculator circuitry 740, example query analyzer circuitry 745, and example query response generator circuitry 750. In operation, the example dataset retrieval circuitry 705 retrieves a product dataset (e.g., example dataset 100 of FIG. 1) from a source. In examples disclosed herein, this source may be any type of database, Internet source, etc. Additionally, in examples disclosed herein, the retrieved product dataset may have any number of entries (e.g., observation number values 102 of FIG. 1) and product nodes (e.g., product node values 104 of FIG. 1). In some examples, the example dataset retrieval circuitry 705 is instantiated by processor circuitry executing dataset retrieval circuitry 705 instructions and/or configured to perform operations such as those represented by the flowcharts of FIGS. 8, 9, and/or 10.

In some examples, the dataset retrieval circuitry 705 of FIG. 7 includes means for retrieving a product dataset (e.g., example dataset 100 of FIG. 1) from a source. For example, the means for retrieving a product dataset (e.g., example dataset 100) from a source may be implemented by dataset retrieval circuitry 705. In some examples, the dataset retrieval circuitry 705 may be instantiated by processor circuitry such as the example processor circuitry 1112 of FIG. 11. For instance, the dataset retrieval circuitry 705 may be instantiated by the example microprocessor 1200 of FIG. 12 executing machine executable instructions such as those implemented by at least block 802 of FIG. 8. In some examples, dataset retrieval circuitry 705 may be instantiated by hardware logic circuitry, which may be implemented by an ASIC, XPU, or the FPGA circuitry 1300 of FIG. 13 structured to perform operations corresponding to the machine readable instructions. Additionally or alternatively, the dataset retrieval circuitry 705 may be instantiated by any other combination of hardware, software, and/or firmware. For example, the dataset retrieval circuitry 705 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example baseline product hierarchies generator circuitry 710 generates (six) baseline product hierarchies for the products and categories provided in the product dataset retrieved by the dataset retrieval circuitry 705 (e.g., dataset 100). In examples disclosed herein, the example product hierarchies may be similar to the example baseline product hierarchy 200 of FIG. 2. In examples disclosed herein, a predetermined number of baseline product hierarchies are generated by the baseline product hierarchies generator circuitry 710, the predetermined number of baseline product hierarchies dependent upon a number of entries (e.g., observation number values 102), time and/or resource budget, etc. For example, six baseline product hierarchies may be generated for each retrieved product dataset. In some examples, empirical data may be used to set the predetermined number of baseline product hierarchies, the empirical data indicating a point of diminishing returns (e.g., time and/or budget intensive processes) per number of baseline hierarchies generated. Additionally, in some examples, the example baseline product hierarchies generator circuitry 710 is instantiated by processor circuitry executing baseline product hierarchies generator circuitry 710 instructions and/or configured to perform operations such as those represented by the flowcharts of FIGS. 8, 9, and/or 10.

In some examples, the baseline product hierarchies generator circuitry 710 of FIG. 7 includes means for generating baseline product hierarchies for the products and categories provided in the product dataset (e.g., dataset 100) retrieved by the dataset retrieval circuitry 705. For example, the means for generating baseline product hierarchies for the products and categories provided in the product dataset retrieved by the dataset retrieval circuitry 705 may be implemented by baseline product hierarchies generator circuitry 710. In some examples, the baseline product hierarchies generator circuitry 710 may be instantiated by processor circuitry such as the example processor circuitry 1112 of FIG. 11. For instance, the baseline product hierarchies generator circuitry 710 may be instantiated by the example microprocessor 1200 of FIG. 12 executing machine executable instructions such as those implemented by at least blocks 804, 902 of FIGS. 8 and/or 9. In some examples, the baseline product hierarchies generator circuitry 710 may be instantiated by hardware logic circuitry, which may be implemented by an ASIC, XPU, or the FPGA circuitry 1300 of FIG. 13 structured to perform operations corresponding to the machine readable instructions. Additionally or alternatively, the baseline product hierarchies generator circuitry 710 may be instantiated by any other combination of hardware, software, and/or firmware. For example, the baseline product hierarchies generator circuitry 710 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example categorical impact calculator circuitry 715 calculates total impact (e.g., total impact (TI) values 112, direct impact (DI) values 210, and/or cross impact (CI) values 212) for each product in the generated product hierarchies using historical sales data, direct impact (DI) data (e.g., direct impact (DI) values 210) and cross impact (e.g., CI values 212), as explained hereinabove in conjunction with at least FIG. 2. In examples disclosed herein, total impact (e.g., total impact (TI) values 112) are calculated by summing the associated direct impact (DI) value 210 and cross impact (CI) value 212. In some examples, the example categorical impact calculator circuitry 715 is instantiated by processor circuitry executing categorical impact calculator circuitry 715 instructions and/or configured to perform operations such as those represented by the flowcharts of FIGS. 8, 9, and/or 10.

In some examples, the categorical impact calculator circuitry 715 of FIG. 7 includes means for calculating categorical impact values for each product and its associated subcategory, using historical sales data, impact values provided in a dataset, etc. For example, the means for calculating categorical impact values for each product and its associated subcategory, using historical sales data, impact values provided in a dataset, etc. may be implemented by categorical impact calculator circuitry 715. In some examples, the categorical impact calculator circuitry 715 may be instantiated by processor circuitry such as the example processor circuitry 1112 of FIG. 11. For instance, the categorical impact calculator circuitry 715 may be instantiated by the example microprocessor 1200 of FIG. 12 executing machine executable instructions such as those implemented by at least blocks, 804, 904 of FIGS. 8 and/or 9. In some examples, the categorical impact calculator circuitry 715 may be instantiated by hardware logic circuitry, which may be implemented by an ASIC, XPU, or the FPGA circuitry 1300 of FIG. 13 structured to perform operations corresponding to the machine readable instructions. Additionally or alternatively, the categorical impact calculator circuitry 715 may be instantiated by any other combination of hardware, software, and/or firmware. For example, the categorical impact calculator circuitry 715 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example average impact calculator circuitry 720 calculates an average impact score (e.g., average of all categorical impact scores calculated by the categorical impact calculator circuitry 715) for every product in each of the baseline product hierarchy configurations generated by the baseline product hierarchies generator circuitry 710. In examples disclosed herein, the average impact score for each product may be calculated by adding together, for example, all TI values 112 for sibling nodes in a product hierarchy tree and dividing by the number of sibling nodes. In some examples, the example average impact calculator circuitry 720 is instantiated by processor circuitry executing average impact calculator circuitry 720 instructions and/or configured to perform operations such as those represented by the flowcharts of FIGS. 8, 9, and/or 10.

In some examples, the average impact calculator circuitry 720 of FIG. 7 includes means for calculating an average impact value (e.g., TI value 112) for products per each subcategory, for each baseline product hierarchy (e.g., each of the six baseline product hierarchies). For example, the means for calculating an average impact value (e.g., TI value 112) for products per each subcategory, across all baseline product hierarchies may be implemented by average impact calculator circuitry 720. In some examples, the average impact calculator circuitry 720 may be instantiated by processor circuitry such as the example processor circuitry 1112 of FIG. 11. For instance, the average impact calculator circuitry 720 may be instantiated by the example microprocessor 1200 of FIG. 12 executing machine executable instructions such as those implemented by at least blocks 804, 906, 1002, 1004 of FIGS. 8, 9, and/or 10. In some examples, the average impact calculator circuitry 720 may be instantiated by hardware logic circuitry, which may be implemented by an ASIC, XPU, or the FPGA circuitry 1300 of FIG. 13 structured to perform operations corresponding to the machine readable instructions. Additionally or alternatively, the average impact calculator circuitry 720 may be instantiated by any other combination of hardware, software, and/or firmware. For example, the average impact calculator circuitry 720 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example average impact based weighting circuitry 725 compares the categorical impact per product (e.g., TI value 112, DI value 210, and/or CI value 212), as calculated by the average impact calculator circuitry 720, to the average impact score calculated by the average impact calculator circuitry 720. In examples disclosed herein, if the average impact based weighting circuitry 725 determines that the categorical impact score (e.g., TI value 112, DI value 210, and/or CI value 212) for each product is greater than the calculated average impact, the product is determined to have a high impact on the given category and is given a high weight, as discussed in greater detail hereinabove. However, if the average impact based weighting circuitry 725 determines that the categorical impact score for each product is less than the average impact, the product is determined to have a low impact on the given category and is assigned a low weight, as discussed in further detail hereinabove. In some examples, the example average impact based weighting circuitry 725 is instantiated by processor circuitry executing average impact based weighting circuitry 725 instructions and/or configured to perform operations such as those represented by the flowcharts of FIGS. 8, 9, and/or 10.

In some examples, the average impact based weighting circuitry 725 of FIG. 7 includes means for comparing the categorical impact per product, as calculated by the average impact calculator circuitry 720, to the average impact score and assigning either a high weight or a low weight based on the comparison. For example, the means for comparing the categorical impact per product, as calculated by the average impact calculator circuitry 720, to the average impact score and assigning either a high weight or a low weight based on the comparison may be implemented by average impact based weighting circuitry 725. In some examples, the average impact based weighting circuitry 725 may be instantiated by processor circuitry such as the example processor circuitry 1112 of FIG. 11. For instance, the average impact based weighting circuitry 725 may be instantiated by the example microprocessor 1200 of FIG. 12 executing machine executable instructions such as those implemented by at least blocks 1006, 1008, 1010 of FIG. 10. In some examples, the average impact based weighting circuitry 725 may be instantiated by hardware logic circuitry, which may be implemented by an ASIC, XPU, or the FPGA circuitry 1300 of FIG. 13 structured to perform operations corresponding to the machine readable instructions. Additionally or alternatively, the average impact based weighting circuitry 725 may be instantiated by any other combination of hardware, software, and/or firmware. For example, the average impact based weighting circuitry 725 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example sales data based weighting circuitry 730 adds an additional weight to the weighted high and weighted low categorical impact scores calculated by the average impact based weighting circuitry 725, based on historical sales data, as explained in greater detail hereinabove. The sales data based weighting circuitry 730 applies sales data associated with each product (e.g., sales instances 106 of FIG. 1) to further determine a weighted categorical impact score (e.g., importance level) of each node in each baseline product hierarchy. In examples disclosed herein, and as explained in greater detail hereinabove in conjunction with at least FIG. 5, weighting by historical sales data assists in further distinguishing products of higher importance from products of low importance (e.g., based on a relative number of sales of each product being examined). In some examples, the example sales data based weighting circuitry 730 is instantiated by processor circuitry executing sales data based weighting circuitry 730 instructions and/or configured to perform operations such as those represented by the flowcharts of FIGS. 8, 9, and/or 10.

In some examples, the sales data based weighting circuitry 730 of FIG. 7 includes means for assigning an additional sales data-based weight to each of the weighted categorical impact scores. For example, the means for assigning an additional sales data based weight to each of the weighted categorical impact scores may be implemented by sales data based weighting circuitry 730. In some examples, the sales data based weighting circuitry 730 may be instantiated by processor circuitry such as the example processor circuitry 1112 of FIG. 11. For instance, the sales data based weighting circuitry 730 may be instantiated by the example microprocessor 1200 of FIG. 12 executing machine executable instructions such as those implemented by at least blocks 908 of FIG. 9. In some examples, the sales data based weighting circuitry 730 may be instantiated by hardware logic circuitry, which may be implemented by an ASIC, XPU, or the FPGA circuitry 1300 of FIG. 13 structured to perform operations corresponding to the machine readable instructions. Additionally or alternatively, the sales data based weighting circuitry 730 may be instantiated by any other combination of hardware, software, and/or firmware. For example, the sales data based weighting circuitry 730 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example product relationships determiner circuitry 735 calculates a relationship value (e.g., CI value 212) for all products within each baseline product hierarchy, as explained in greater detail hereinabove (e.g., in conjunction with at least FIG. 5), by applying the two weighting factors determined by the average impact based weighting circuitry 725 and the sales data based weighting circuitry 730. In examples disclosed herein, and as explained in greater detail hereinabove (e.g., using Equations 1-5B), the product relationships determiner circuitry 735 calculates a set of UPC-UPC impacts (e.g., in a matrix) for each of the baseline product hierarchies generated by the example baseline product hierarchies generator circuitry 710. The UPC-UPC impact values, as determined by the product relationships determiner circuitry 735, represents an effect a first product has on a second product being examined (e.g., a rate of cannibalization, etc.), as indicated by a cross impact (e.g., CI value 212 of FIG. 2). In some examples, the example product relationships determiner circuitry 735 is instantiated by processor circuitry executing product relationships determiner circuitry 735 instructions and/or configured to perform operations such as those represented by the flowcharts of FIGS. 8, 9, and/or 10.

In some examples, the product relationships determiner circuitry 735 of FIG. 7 includes means for applying the calculated weighting factors to the categorical impact values and determining a set of UPC-UPC impacts for each of the baseline product hierarchies. For example, the means for applying the calculated weighting factors to the categorical impact values and determining a set of UPC-UPC impacts for each of the baseline product hierarchies may be implemented by product relationships determiner circuitry 735. In some examples, the product relationships determiner circuitry 735 may be instantiated by processor circuitry such as the example processor circuitry 1112 of FIG. 11. For instance, the product relationships determiner circuitry 735 may be instantiated by the example microprocessor 1200 of FIG. 12 executing machine executable instructions such as those implemented by at least blocks 804, 910 of FIGS. 8, 9. In some examples, the product relationships determiner circuitry 735 may be instantiated by hardware logic circuitry, which may be implemented by an ASIC, XPU, or the FPGA circuitry 1300 of FIG. 13 structured to perform operations corresponding to the machine readable instructions. Additionally or alternatively, the product relationships determiner circuitry 735 may be instantiated by any other combination of hardware, software, and/or firmware. For example, the product relationships determiner circuitry 735 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example Q-values calculator circuitry 740 determines a set of confidence values associated with each of the product relationship values calculated by the product relationships determiner circuitry 735, in accordance with the teachings of this disclosure (e.g., as explained hereinabove in conjunction with at least FIG. 5). For example the Equations 5A and/or 5B and the accompanying description hereinabove detail calculation of the Q-values for each of the calculated product relationship values. In examples disclosed herein, these Q-values may be included alongside the relationship data (e.g., the relationship matrix 500 of FIG. 5) in order to indicate a level of confidence associated with each of the imputed and/or calculated value (e.g., as calculated by the product relationships determiner circuitry 735). In some examples, the example Q-values calculator circuitry 740 is instantiated by processor circuitry executing Q-values calculator circuitry 740 instructions and/or configured to perform operations such as those represented by the flowcharts of FIGS. 8, 9, and/or 10.

In some examples, the Q-values calculator circuitry 740 of FIG. 7 includes means for calculating a set of confidence levels associated with each of the product relationship values calculated by the product relationships determiner circuitry 735. For example, the means calculating a set of confidence levels associated with each of the product relationship values calculated by the product relationships determiner circuitry 735 may be implemented by Q-values calculator circuitry 740. In some examples, the Q-values calculator circuitry 740 may be instantiated by processor circuitry such as the example processor circuitry 1112 of FIG. 11. For instance, the Q-values calculator circuitry 740 may be instantiated by the example microprocessor 1200 of FIG. 12 executing machine executable instructions such as those implemented by at least block 806 of FIG. 8. In some examples, the Q-values calculator circuitry 740 may be instantiated by hardware logic circuitry, which may be implemented by an ASIC, XPU, or the FPGA circuitry 1300 of FIG. 13 structured to perform operations corresponding to the machine readable instructions. Additionally or alternatively, the Q-values calculator circuitry 740 may be instantiated by any other combination of hardware, software, and/or firmware. For example, the Q-values calculator circuitry 740 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example query analyzer circuitry 745 receives a query (e.g., from a client, retailer, manufacturer, etc.) regarding product impacts, product assortments, product cannibalization, etc. and determines any number of products values that may be necessary in order to provide a response to the query. In examples disclosed herein, as part of the information received along with the query is a list of products about which an inquiry is being made (e.g., from which relationship values and/or Q-values are to be selected by the example report generator circuitry 755), however, in other examples, this information may not be explicitly provided. In some examples, the example query analyzer circuitry 745 includes Natural Language Processes, Machine Learning (ML) techniques, etc. in order to analyze the query to determine what product information is required to provide a response. In some examples, the example query analyzer circuitry 745 is instantiated by processor circuitry executing query analyzer circuitry 745 instructions and/or configured to perform operations such as those represented by the flowcharts of FIGS. 8, 9, and/or 10.

In some examples, the query analyzer circuitry 745 of FIG. 7 includes means for analyzing queries (e.g., from a client) with the purpose of determining necessary information (e.g., products) to provide an answer to the query. For example, the means for analyzing queries (e.g., from a client) with the purpose of determining necessary information (e.g., products) to provide an answer to the query may be implemented by query analyzer circuitry 745. In some examples, the query analyzer circuitry 745 may be instantiated by processor circuitry such as the example processor circuitry 1112 of FIG. 11. For instance, the query analyzer circuitry 745 may be instantiated by the example microprocessor 1200 of FIG. 12 executing machine executable instructions such as those implemented by at least block 808 of FIG. 8. In some examples, the query analyzer circuitry 745 may be instantiated by hardware logic circuitry, which may be implemented by an ASIC, XPU, or the FPGA circuitry 1300 of FIG. 13 structured to perform operations corresponding to the machine readable instructions. Additionally or alternatively, the query analyzer circuitry 745 may be instantiated by any other combination of hardware, software, and/or firmware. For example, the query analyzer circuitry 745 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example query response generator circuitry 750 computes an average of all the product relationship values determined by the product relationships determiner circuitry 735 and the Q-values determined by the Q-values calculator circuitry 740 in order to generate a final set of average values across all baseline product hierarchies (e.g., baseline product hierarchy 200 of FIG. 2). For example, in examples disclosed herein, a linear regression method may be run across all (six) respective relationship matrices (e.g., relationship matrix 500 of FIG. 5) for all (six) baseline product hierarchies in order to determine a final, average relationship matrix (e.g., a blended relationship matrix) showing an average set of relationship values for all products across all (six) baseline product hierarchies. Similarly, for each of the Q-values associated with each calculated relationship values, a similar linear regression method may be used, in examples disclosed herein, in order to compute a final blended set of values that accompany the blended relationship values. Upon generating this final, blended set of relationship and/or Q-values, the example query response generator circuitry 750 then selects the particular relationship value(s) associated with each particular product interaction and the associated Q-value(s) for reporting. In examples disclosed herein, the particular product interaction(s) of interest are described and/or determined by the query analyzer circuitry 745 to fit the criteria of a client query. In some examples, the example query response generator circuitry 750 is instantiated by processor circuitry executing query response generator circuitry 750 instructions and/or configured to perform operations such as those represented by the flowcharts of FIGS. 8, 9, and/or 10.

In some examples, the query response generator circuitry 750 of FIG. 7 includes means for determining a blended relationship value and an associated blended Q-value, based on the query criteria determined by the query analyzer circuitry 745. For example, the means for determining a blended relationship value and an associated blended Q-value, based on the query criteria determined by the query analyzer circuitry 745 may be implemented by query response generator circuitry 750. In some examples, the query response generator circuitry 750 may be instantiated by processor circuitry such as the example processor circuitry 1112 of FIG. 11. For instance, the query response generator circuitry 750 may be instantiated by the example microprocessor 1200 of FIG. 12 executing machine executable instructions such as those implemented by at least blocks 808, 812 of FIG. 8. In some examples, the query response generator circuitry 750 may be instantiated by hardware logic circuitry, which may be implemented by an ASIC, XPU, or the FPGA circuitry 1300 of FIG. 13 structured to perform operations corresponding to the machine readable instructions. Additionally or alternatively, the query response generator circuitry 750 may be instantiated by any other combination of hardware, software, and/or firmware. For example, the query response generator circuitry 750 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example report generator circuitry 755 selects the blended relationship value(s) and/or associated Q-value(s), as determined from the criteria of a client query by the query analyzer circuitry 745, and as calculated by the query response generator circuitry 750 for reporting (e.g., via a graphical user interface). In examples disclosed herein, this report may be presented to a client, retailer, manufacturer, etc. that is interested in optimizing store shelf arrangements, product usage, etc. in order to maximize sales and/or minimize product cannibalization for efficient and/or high-profit business. In some examples, the example report generator circuitry 755 is instantiated by processor circuitry executing report generator circuitry 755 instructions and/or configured to perform operations such as those represented by the flowcharts of FIGS. 8, 9, and/or 10.

In some examples, the report generator circuitry 755 of FIG. 7 includes means for selecting blended relationship values and/or their associated Q-values for presentation e.g., to a client, retailer, manufacturer, etc. For example, the means for selecting blended relationship values and/or their associated Q-values for presentation e.g., to a client, retailer, manufacturer, etc. may be implemented by report generator circuitry 755. In some examples, the query response generator circuitry 750 may be instantiated by processor circuitry such as the example processor circuitry 1112 of FIG. 11. For instance, the report generator circuitry 755 may be instantiated by the example microprocessor 1200 of FIG. 12 executing machine executable instructions such as those implemented by at least block 814 of FIG. 8. In some examples, the report generator circuitry 755 may be instantiated by hardware logic circuitry, which may be implemented by an ASIC, XPU, or the FPGA circuitry 1300 of FIG. 13 structured to perform operations corresponding to the machine readable instructions. Additionally or alternatively, the report generator circuitry 755 may be instantiated by any other combination of hardware, software, and/or firmware. For example, the report generator circuitry 755 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 8:
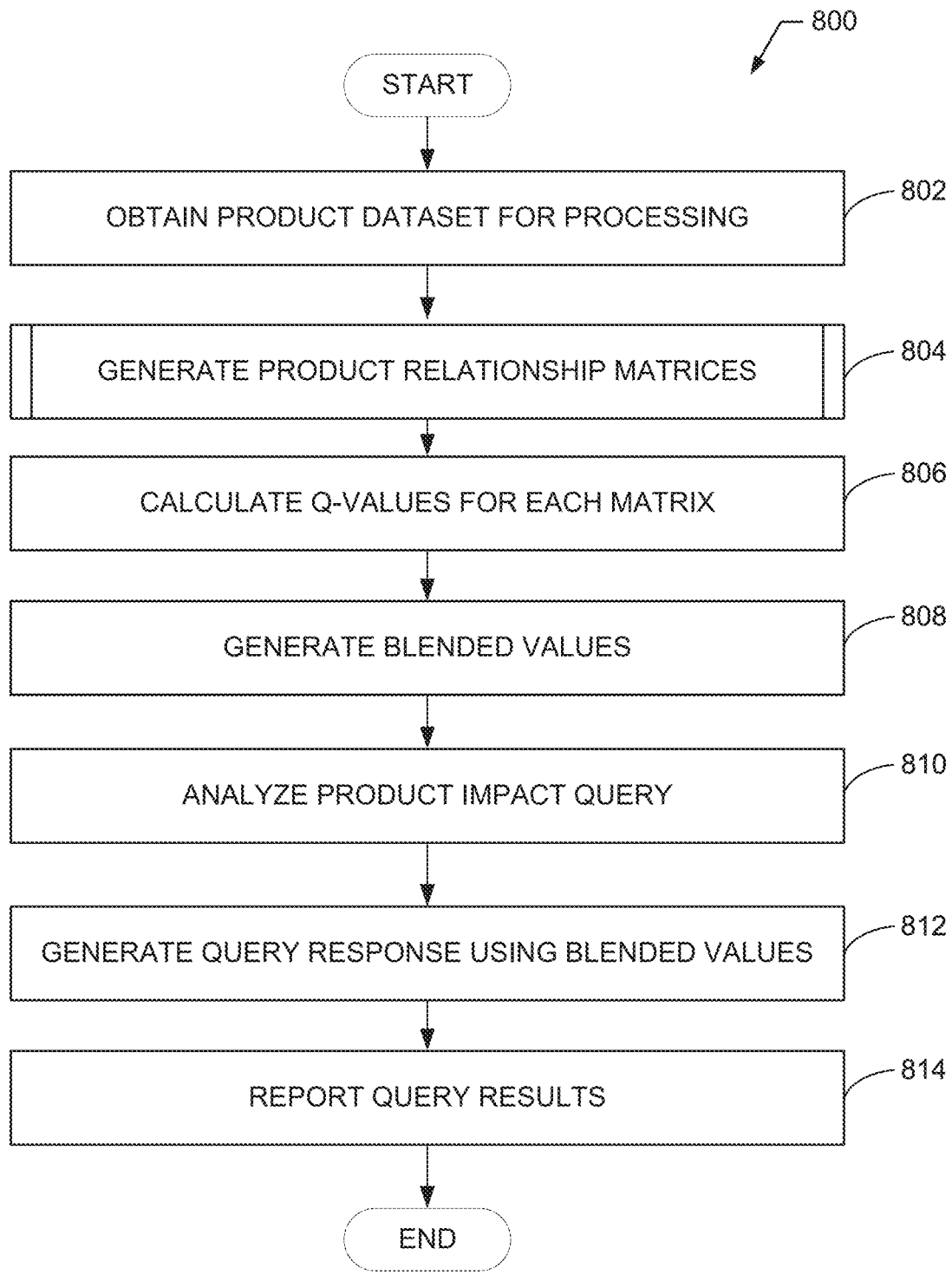
FIGS. 8-10 are flowcharts representative of machine readable instructions which may be executed to implement the example baseline product hierarchy framework of FIG. 6 and/or the example product assortment circuitry of FIG. 7, in accordance with the teachings of this disclosure.
Figure 9:
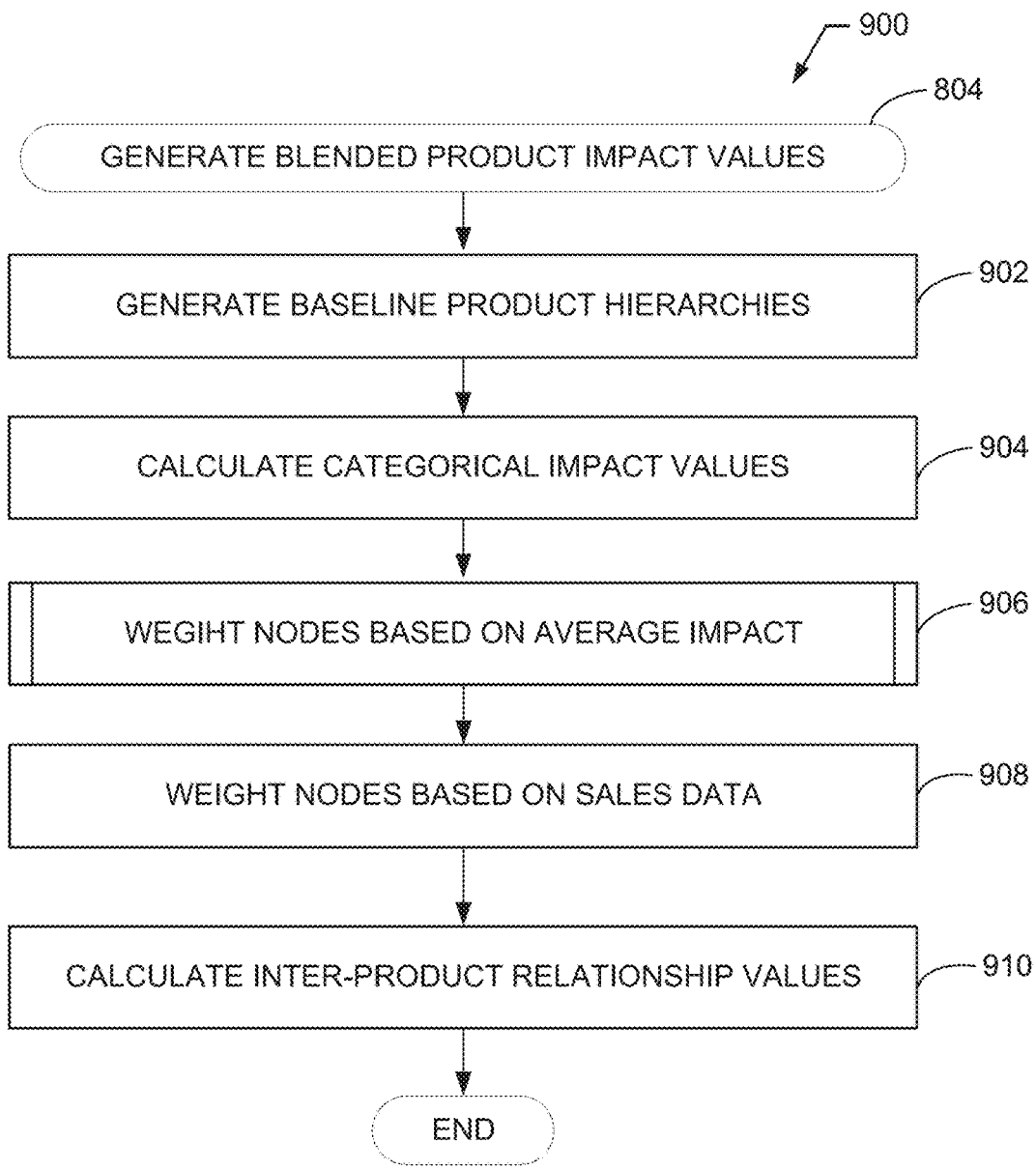
Figure 10:
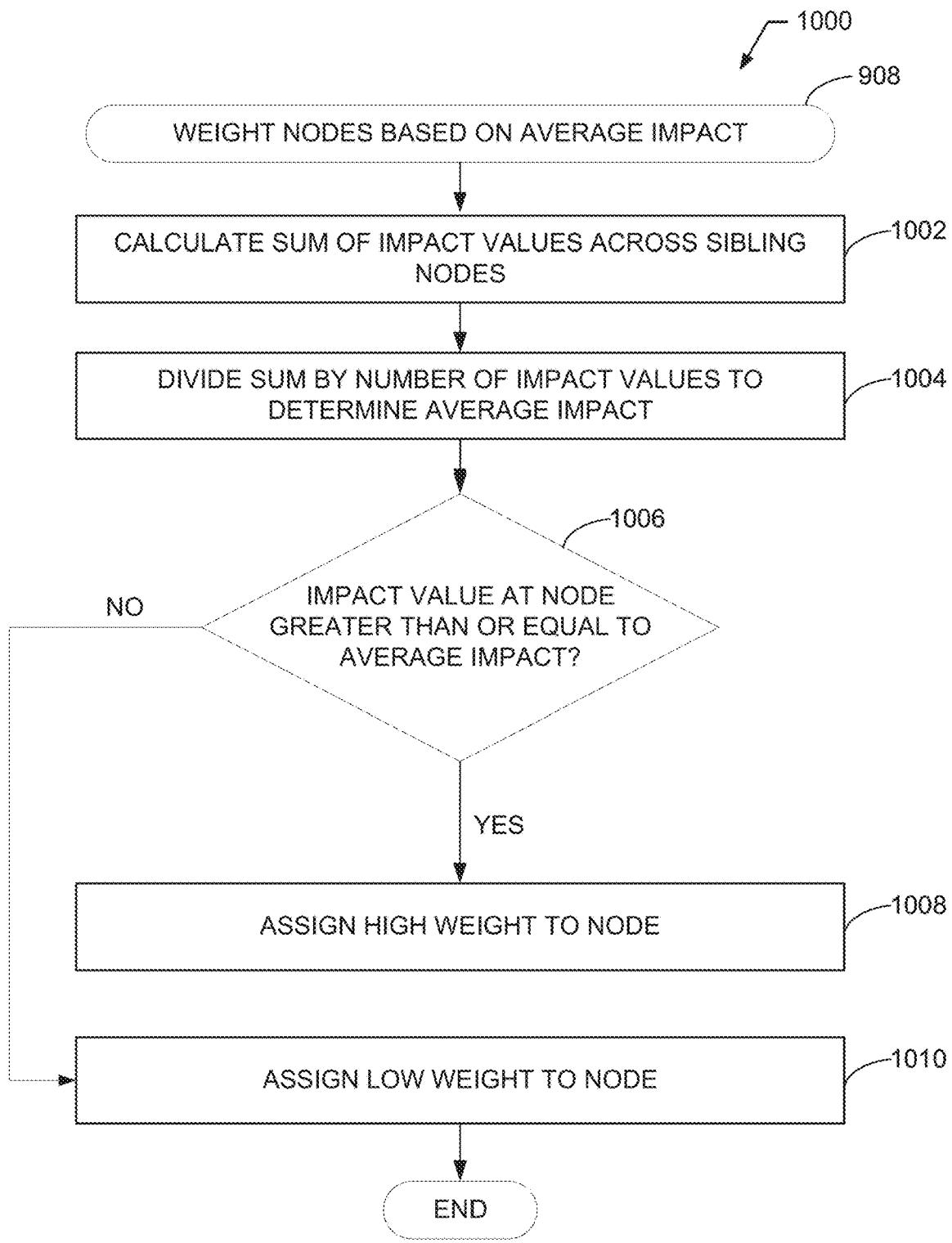

While an example manner of implementing the product assortment circuitry 700 is illustrated in FIG. 7 one or more of the elements, processes and/or devices illustrated in FIG. 7 may be combined, divided, re-arranged, omitted, eliminated and/or implemented in any other way. Further, the example dataset retrieval circuitry 705, the example baseline product hierarchies generator circuitry 710, the example categorical impact calculator circuitry 715, the example average impact calculator circuitry 720, the example average impact based weighting circuitry 725, the example sales data based weighting circuitry 730, the example product relationships determiner circuitry 735, the example Q-values calculator circuitry 740, the example query analyzer circuitry 745, the example query response generator circuitry 750, the example report generator circuitry 755, and/or, more generally, the product assortment circuitry 700 of FIG. 7 may be implemented by hardware, software, firmware and/or any combination of hardware, software and/or firmware. Thus, for example, any of the example dataset retrieval circuitry 705, the example baseline product hierarchies generator circuitry 710, the example categorical impact calculator circuitry 715, the example average impact calculator circuitry 720, the example average impact based weighting circuitry 725, the example sales data based weighting circuitry 730, the example product relationships determiner circuitry 735, the example Q-values calculator circuitry 740, the example query analyzer circuitry 745, the example query response generator circuitry 750, the example report generator circuitry 755, and/or, more generally, the example product assortment circuitry 700, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example product assortment circuitry 700 of FIG. 7 may include one or more elements, processes, and/or devices in addition to, or instead of, those illustrated in FIG. 7, and/or may include more than one of any or all of the illustrated elements, processes and devices. A flowchart representative of example machine readable instructions, which may be executed to configure processor circuitry to implement the product assortment circuitry 700 of FIG. 7, is shown in FIGS. 8-10. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 8-10, many other methods of implementing the example product assortment circuitry 700 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 8-10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions and/or example operations 800 that may be executed and/or instantiated by processor circuitry to answer queries related to product impact using product assortments and/or blended hierarchies. The machine readable instructions and/or the operations 800 of FIG. 8 begin at block 802, at which the dataset retrieval circuitry 705 obtains a product dataset for processing. In examples disclosed herein, the obtained product dataset may be similar to the example dataset 100 of FIG. 1. Additionally, in examples disclosed herein, the product dataset may be obtained by the dataset retrieval circuitry 705 from a database, an Internet source, etc.

At block 804, the product assortment circuitry 700 generates product relationship matrices. The generation of product relationship matrices, as performed by the product assortment circuitry 700, is explained further in conjunction with FIG. 9.

At block 806, the Q-values calculator circuitry 740 calculates a set of confidence values (e.g., Q-values) associated with each of the product relationship values calculated for all baseline product hierarchies (e.g., baseline product hierarchy 200 of FIG. 2), indicating a level of confidence associated with each of the calculated values.

At block 808, the query response generator circuitry 750 generates blended relationship values and/or associated Q-values to determine a set of average, product hierarchy-independent product relationship and/or impact values. In examples disclosed herein, the query response generator circuitry 750 may perform linear regression on each of the calculated relationship values (e.g., relationship matrices) and their associated Q-values in order to determine a final set of blended (e.g., average) relationship values and/or Q-values, representative of an average impact and/or cannibalization rate associated with each given UPC interaction.

At block 810, a product impact query (e.g., a client query) is analyzed by query analyzer circuitry 745 in order to determine a set of products from which relationship values and/or Q-values are to be returned by the example report generator circuitry 755. In examples disclosed herein, as part of the information obtained along with the query by the query analyzer circuitry 745 is a list of products about which an inquiry is being made (e.g., from which relationship values and/or Q-values are to be selected by the example report generator circuitry 755), however, in other examples, this information may not be explicitly provided. In some examples, the example query analyzer circuitry 745 utilizes Natural Language Processes, Machine Learning (ML) techniques, etc. in order to analyze the query to determine what product information is required to provide a response.

At block 812, the query response generator circuitry 750 generates a query response using the blended values computed by the query response generator circuitry 750 at block 808. The query response generator circuitry 750 selects the blended relationship value(s) and/or associated Q-value(s), as determined from the criteria of a client query by the query analyzer circuitry 745 at block 810, and as calculated by the query response generator circuitry 750 at block 808 for reporting by the report generator circuitry 755 at block 814. As described in detail hereinabove, these blended value(s) and their associated Q-value(s) indicate an average impact (e.g., rate of cannibalization) a given node (e.g., product, UPC, etc.) has on any other given node, along with a calculated confidence metric associated with that average impact.

At block 814, the report generator circuitry 755 reports the query results determined at block 812 by the query response generator circuitry 750. In examples disclosed herein, this report may be presented via a graphical user interface, etc. to a client, retailer, manufacturer, etc. to aid in improvement of store shelf arrangement in order to maximize product sales and/or minimize product cannibalization.

FIG. 9 is a flowchart representative of example machine readable instructions 900 that may be executed by a processor to implement the example product assortment circuitry 700 of FIG. 7 to generate blended product impact values.

As illustrated in FIG. 9, at block 902, the baseline product hierarchies generator circuitry 710 generates (six) baseline product hierarchies (e.g., baseline product hierarchy 200 of FIG. 2) for the products and categories provided in the product dataset (e.g., dataset 100 of FIG. 1) obtained by the dataset retrieval circuitry 705 at block 802 of FIG. 8, the different baseline product hierarchies representing different viewpoints and/or configurations of products. In examples disclosed herein, a predetermined number of baseline product hierarchies are generated by the baseline product hierarchies generator circuitry 710, the predetermined number of baseline product hierarchies dependent upon a number of entries (e.g., observation number values 102), time and/or resource budget, etc. For example, six baseline product hierarchies may be generated for each retrieved product dataset. In some examples, empirical data may be used to set the predetermined number of baseline product hierarchies, the empirical data indicating a point of diminishing returns (e.g., time and/or budget intensive processes) per number of baseline hierarchies generated.

At block 904, the categorical impact calculator circuitry 715 calculates categorical impact values (e.g., total impact (TI) values 112, direct impact (DI) values 210, and/or cross impact (CI) values 212) for each product in the baseline product hierarchies generated by the baseline product hierarchies generator circuitry 710 at block 902, using historical sales data, direct impact (DI) data (e.g., direct impact (DI) values 210) and competitive impact data (e.g., CI values 212). In examples disclosed herein, the categorical impact values calculated by the categorical impact calculator circuitry 715 are then associated with each product for the particular configuration (e.g., product hierarchy) in which they was calculated.

At block 906, the average impact calculator circuitry 720 and/or the average impact based weighting circuitry 725 weight each of the categorical impact values calculated by the categorical impact calculator circuitry 715 at block 904, based on a relative importance to an overall category and/or subcategory (e.g., preceding parent node). The weighting of nodes based on average impact by the average impact calculator circuitry 720 and/or the average impact based weighting circuitry 725 is explained further in conjunction with FIG. 10.

At block 908 historical sales data (e.g., sales instances 106 of FIG. 1) is used by the sales data based weighting circuitry 730 in order to compute an additional weight for each product, to further determine a relative importance of each product (e.g., relative to their sibling products, etc.). The sales data based weighting circuitry 630 applies sales data associated with each product (e.g., sales instances 106 of FIG. 1), as described in detail hereinabove in conjunction with at least FIG. 5 to further determine a de-biased relative product importance.

At block 910, the product relationships determiner circuitry 735 calculates a set of relationship values between all products in each of the baseline product hierarchies, weighted by relative importance to an overall parent node, (e.g., using Equations 1-5B of FIG. 5). These relationship values indicate a quantified effect of one product to another, when arranged together on a store shelf, for example.

FIG. 10 is a flowchart representative of example machine readable instructions and/or example operations 1000 that may be executed and/or instantiated by processor circuitry in conjunction with the product assortment circuitry 700 of FIG. 7 to weight nodes in a given baseline product hierarchy based on a calculated average impact.

At block 1002, a sum of impact values (e.g., TI values 112, DI values 210, and/or CI values 212) is calculated across all sibling nodes of a common parent node (e.g., for all nodes falling with a same category and/or subcategory) by the average impact calculator circuitry 720.

At block 1004, the sum of the impact values (e.g., TI values 112, DI values 210, and/or CI values 212), as calculated at block 1002 by the average impact calculator circuitry 720 is divided by the number of sibling nodes used to calculate the sum by the average impact calculator circuitry 720. That is, the example average impact calculator circuitry 720 computes an average impact for the parent node, across all child nodes.

At block 1006, the impact values at each node are compared, by the average impact based weighting circuitry 725, against the average impact values calculated at block 1004 by the average impact calculator circuitry 730. The average impact based weighting circuitry 725 determines whether the impact value is greater than or equal to the average impact (e.g., across all sibling nodes). If the impact value is determined to be greater than or equal to the average impact, by the average impact based weighting circuitry 725, the process moves to block 1008. However, if the impact value is determined to be less than the average impact value, by the average impact based weighting circuitry 725, the process moves to block 1010.

At block 1008, a "high" weight is assigned to the node, in accordance with the teachings of this disclosure, and as explained hereinabove in conjunction with at least FIG. 5, by the average impact based weighting circuitry 725.

At block 1010, a "low" weight is assigned to the node, in accordance with the teachings of this disclosure, and as explained hereinabove in conjunction with at least FIG. 5, by the average impact based weighting circuitry 725.

Figure 11:
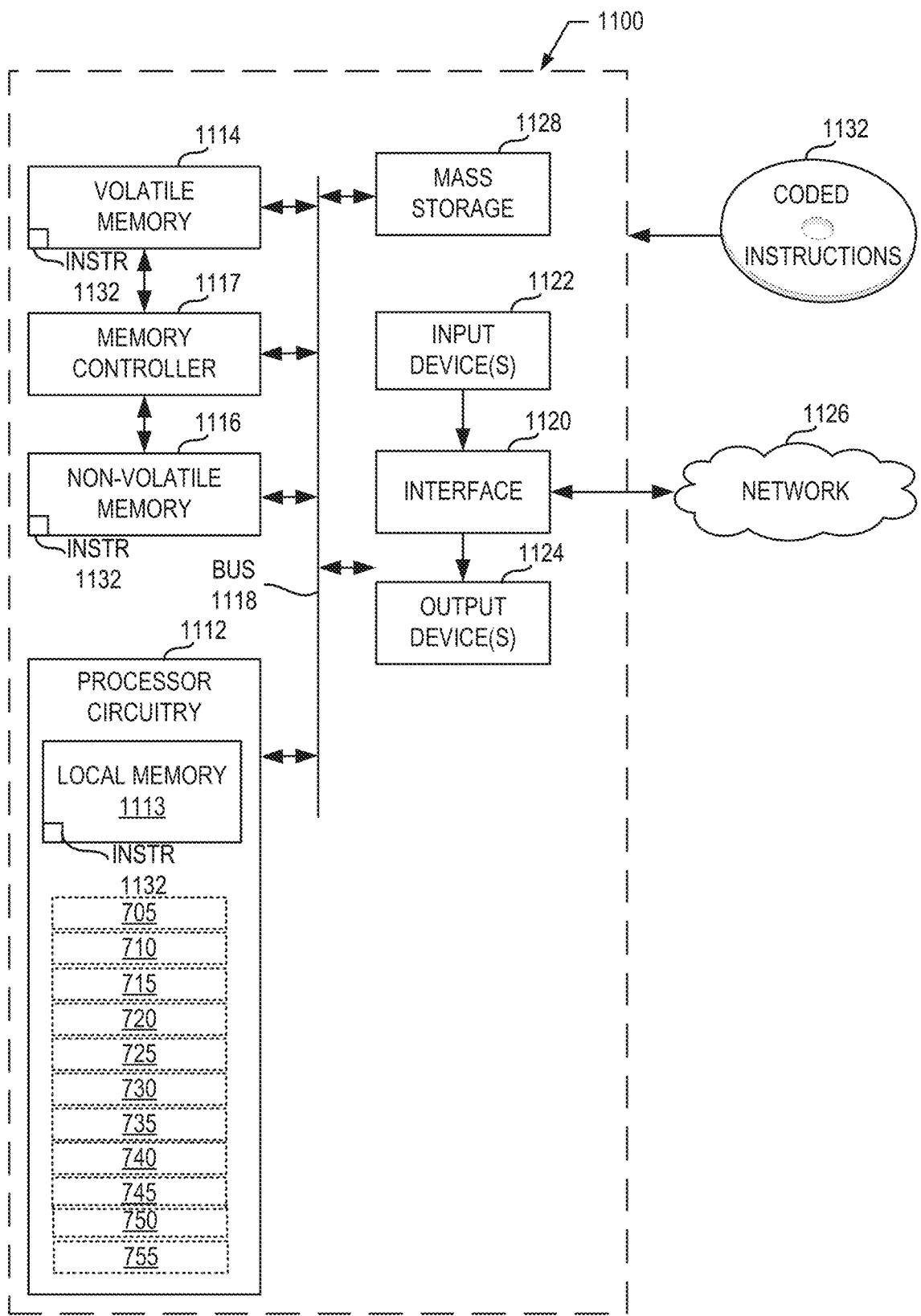
FIG. 11 is a block diagram of an example processing platform structured to execute the instructions of FIGS. 8-9 to implement the example baseline product hierarchy framework of FIG. 6 and/or the example product assortment circuitry of FIG. 7.

FIG. 11 is a block diagram of an example processor platform 1100 structured to execute and/or instantiate the machine readable instructions and/or the operations of FIGS. 8-10 to implement the product assortment circuitry 700 of FIG. 7. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example dataset retrieval circuitry 705, the example baseline product hierarchies generator circuitry 710, the example categorical impact calculator circuitry 715, the example average impact calculator circuitry 720, the example average impact based weighting circuitry 725, the example sales data based weighting circuitry 730, the example product relationships determiner circuitry 735, the example Q-values calculator circuitry 740, the example query analyzer circuitry 745, the example query response generator circuitry 750, and the example report generator circuitry 755.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1132, which may be implemented by the machine readable instructions of FIGS. 8-10, may be stored in the mass storage device 1128, in the volatile memory 1114, in the non-volatile memory 1116, and/or on a removable non-transitory computer readable storage medium such as a CD or DVD.

Figure 12:
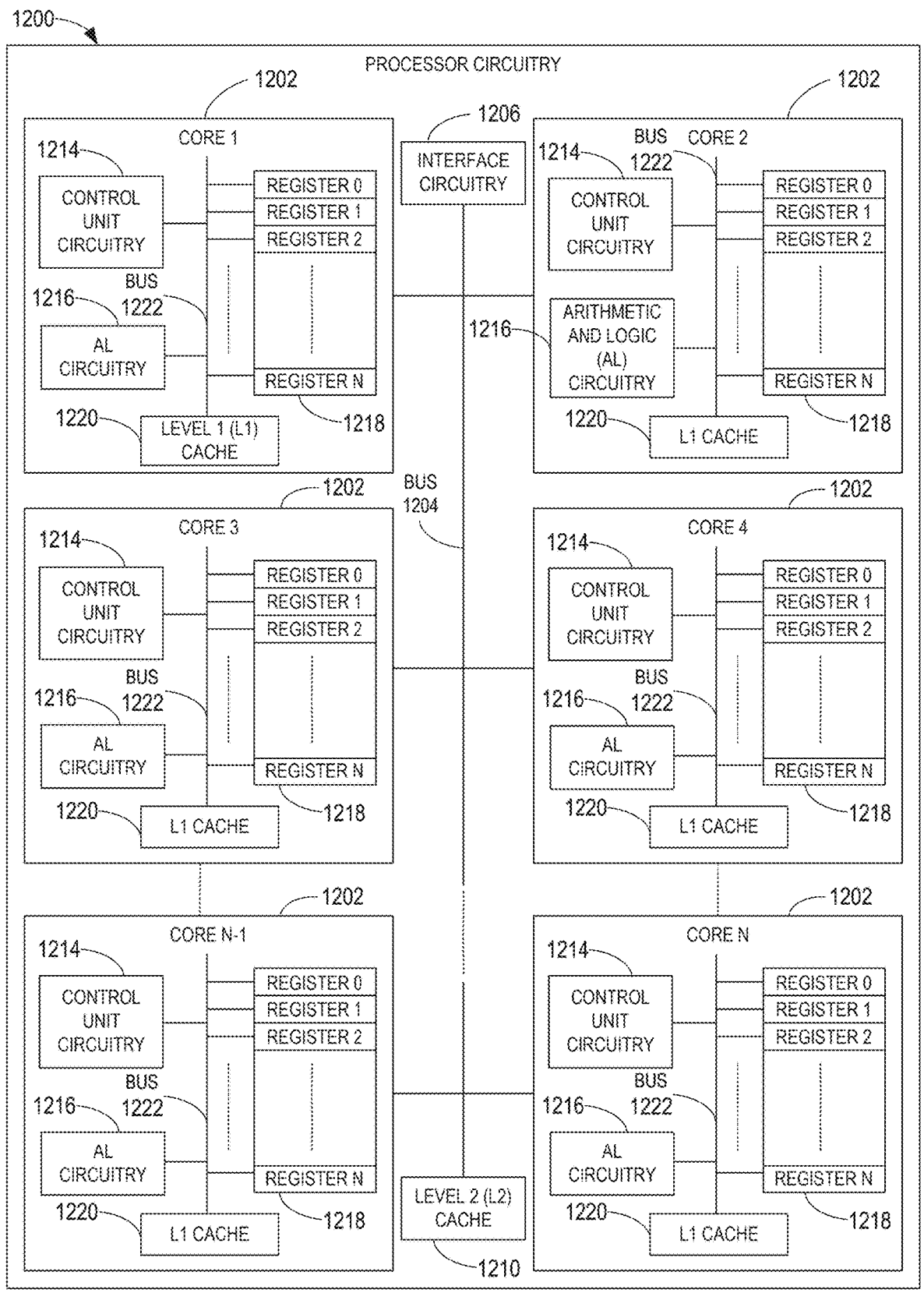
FIG. 12 is a block diagram of an example implementation of the processor circuitry of FIG. 10.

FIG. 12 is a block diagram of an example implementation of the processor circuitry 1112 of FIG. 11. In this example, the processor circuitry 1112 of FIG. 11 is implemented by a microprocessor 1200. For example, the microprocessor 1200 may be a general purpose microprocessor (e.g., general purpose microprocessor circuitry). The microprocessor 1200 executes some or all of the machine readable instructions of the flowcharts of FIGS. 8-10 to effectively instantiate the product assortment circuitry 700 of FIG. 7 as logic circuits to perform the operations corresponding to those machine readable instructions. In some such examples, the product assortment circuitry 700 of FIG. 7 is instantiated by the hardware circuits of the microprocessor 1200 in combination with the instructions. For example, the microprocessor 1200 may be implemented by multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowcharts of FIGS. 8-10.

The cores 1202 may communicate by a first example bus 1204. In some examples, the first bus 1204 may be implemented by a communication bus to effectuate communication associated with one(s) of the cores 1202. For example, the first bus 1204 may be implemented by at least one of an Inter-Integrated Circuit (I2C) bus, a Serial Peripheral Interface (SPI) bus, a PCI bus, or a PCIe bus. Additionally or alternatively, the first bus 1204 may be implemented by any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2 cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the local memory 1220, and a second example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The second bus 1222 may be implemented by at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
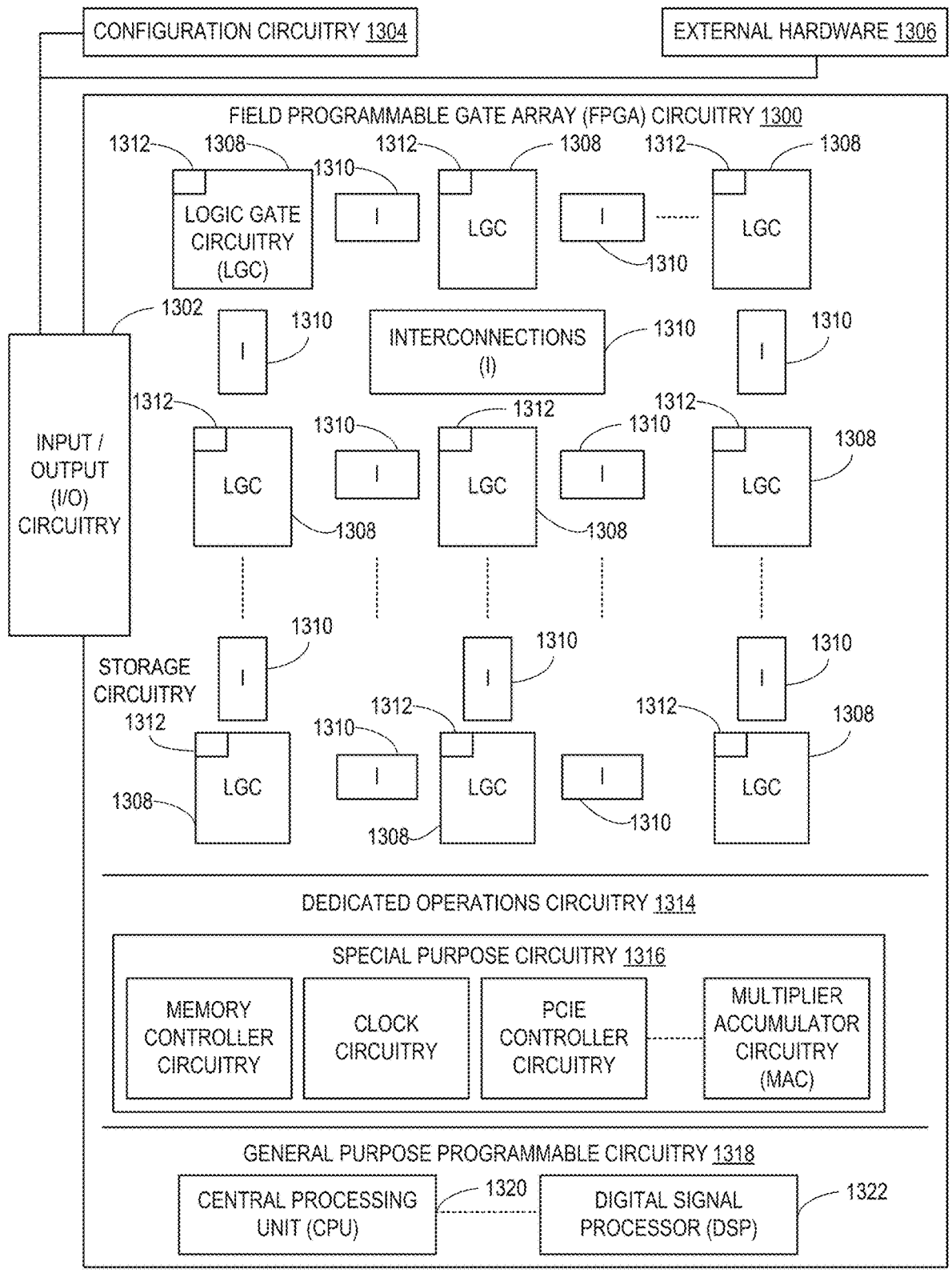
FIG. 13 is a block diagram of another example implementation of the processor circuitry of FIG. 10.

FIG. 13 is a block diagram of another example implementation of the processor circuitry 1112 of FIG. 11. In this example, the processor circuitry 1112 is implemented by FPGA circuitry 1300. For example, the FPGA circuitry 1300 may be implemented by an FPGA. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowcharts of FIGS. 8-10 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowcharts of FIGS. 8-10. In particular, the FPGA circuitry 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowcharts of FIGS. 8-10. As such, the FPGA circuitry 1300 may be structured to effectively instantiate some or all of the machine readable instructions of the flowcharts of FIGS. 8-10 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 8-10 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware 1306. For example, the configuration circuitry 1304 may be implemented by interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may be implemented by external hardware circuitry. For example, the external hardware 1306 may be implemented by the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and the configurable interconnections 1310 are configurable to instantiate one or more operations that may correspond to at least some of the machine readable instructions of FIGS. 8-10 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The configurable interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an on-board CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowcharts of FIGS. 8-10 may be executed by one or more of the cores 1202 of FIG. 12, a second portion of the machine readable instructions represented by the flowcharts of FIGS. 8-10 may be executed by the FPGA circuitry 1300 of FIG. 13, and/or a third portion of the machine readable instructions represented by the flowcharts of FIGS. 8-10 may be executed by an ASIC. It should be understood that some or all of the product assortment circuitry 700 of FIG. 7 may, thus, be instantiated at the same or different times. Some or all of the circuitry may be instantiated, for example, in one or more threads executing concurrently and/or in series. Moreover, in some examples, some or all of the product assortment circuitry 700 of FIG. 7 may be implemented within one or more virtual machines and/or containers executing on the microprocessor.

In some examples, the processor circuitry 1112 of FIG. 11 may be in one or more packages. For example, the microprocessor 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Figure 14:
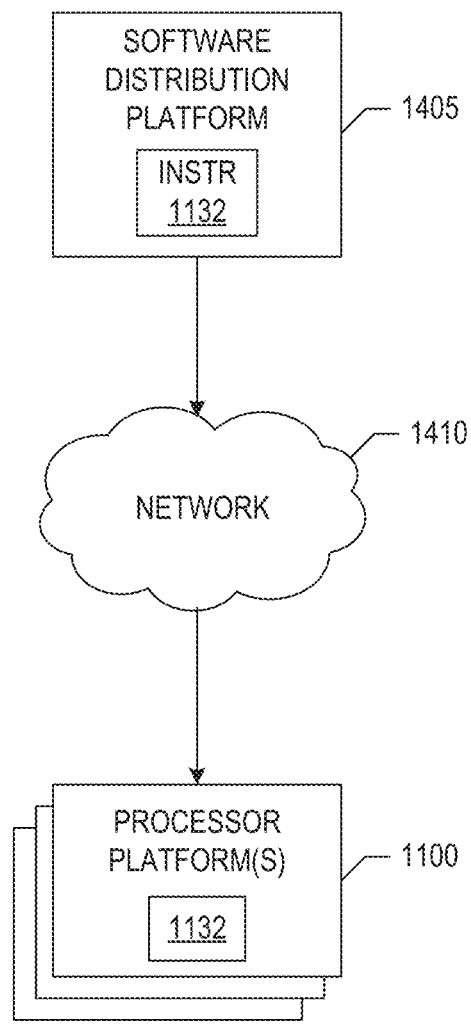
FIG. 14 is a block diagram of an example software distribution platform to distribute software (e.g., software corresponding to the example computer readable instructions of FIGS. 8-9) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to other end users such as direct buy consumers).

A block diagram illustrating an example software distribution platform 1405 to distribute software such as the example machine readable instructions 1132 of FIG. 11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1132, which may correspond to the example machine readable instructions 800, 900, 1000 of FIGS. 8-10, as described above. The one or more servers of the example software distribution platform 1405 are in communication with an example network 1410, which may correspond to any one or more of the Internet and/or any of the example networks 1126, 1410 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1405. For example, the software, which may correspond to the example machine readable instructions 800, 900, 1000 of FIGS. 8-10, may be downloaded to the example processor platform 1100, which is to execute the machine readable instructions 1132 to implement the example product assortment circuitry 700 of FIG. 7. In some examples, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices.

Example methods, apparatus, systems, and articles of manufacture for configuration segmentation of product assortments are disclosed. Further examples and combinations thereof include the following:

Example 1 includes a non-transitory computer readable medium comprising instructions that, when executed, cause a machine to at least generate a baseline product hierarchy using product information, calculate categorical impact values for products in the baseline product hierarchy, calculate an average impact value for the baseline product hierarchy using the calculated categorical impact values, calculate a first weighting factor for respective ones of the products based on a comparison between the categorical impact values and the average impact value, calculate a second weighting factor associated with respective ones of the products in the baseline product hierarchy based on sales data, generate final weighted categorical impact values based on (a) the first weighting factors, (b) the second weighting factors and (c) the categorical impact values corresponding to the respective ones of the products, calculate response criteria corresponding to a product impact query based on a grouping of the products, and select the final weighted categorical impact values associated with the response criteria to form a query result that identifies store shelf rearrangement instructions.

Example 2 includes the non-transitory computer readable medium of example 1, wherein the instructions, when executed, cause the machine to form multiple baseline product hierarchies using the product information.

Example 3 includes the non-transitory computer readable medium of example 2, wherein the instructions, when executed, cause the machine to average the final weighted categorical impact values across the multiple baseline product hierarchies to generate blended categorical impact values.

Example 4 includes the non-transitory computer readable medium of example 1, wherein the instructions, when executed, cause the machine to calculate the categorical impact values using direct impact values from the product information and cross impact values from the product information.

Example 5 includes the non-transitory computer readable medium of example 4, wherein the direct impact values indicate an effect of a category on itself.

Example 6 includes the non-transitory computer readable medium of example 4, wherein the cross impact values indicate an effect of a category on its sibling categories.

Example 7 includes the non-transitory computer readable medium of example 4, wherein the instructions, when executed, cause the machine to calculate the categorical impact values by adding the direct impact values and the cross impact values.

Example 8 includes the non-transitory computer readable medium of example 1, wherein the instructions, when executed, cause the machine to calculate a confidence metric for respective ones of the final weighted categorical impact values, the confidence metric indicating a level of accuracy certainty.

Example 9 includes the non-transitory computer readable medium of example 8, wherein the instructions, when executed, cause the machine to select the final weighted categorical impact values associated with the response criteria to form the query result in response to the associated confidence metric satisfying a threshold value.

Example 10 includes the non-transitory computer readable medium of example 1, wherein the instructions, when executed, cause the machine to calculate the first weighting factor for each product to be a low weight in response to the average impact value for the baseline product hierarchy being greater than or equal to the associated categorical impact value.

Example 11 includes the non-transitory computer readable medium of example 1, wherein the instructions, when executed, cause the machine to calculate the first weighting factor for each product to be a high weight in response to the average impact value for the baseline product hierarchy being less than the associated categorical impact value.

Example 12 includes the non-transitory computer readable medium of example 1, wherein the instructions, when executed, cause the machine to obtain the grouping of the products from the product information.

Example 13 includes the non-transitory computer readable medium of example 1, wherein the instructions, when executed, cause the machine to report the query result to at least facilitate efficient arrangement of store shelves to minimize product cannibalization, using the selected final weighted categorical impact values.

Example 14 includes an apparatus to facilitate efficient rearrangement of store shelves in order to minimize product cannibalization comprising interface circuitry to access an image from a receipt image capturing device, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations according to instructions, and one or more registers to store a result of the one or more first operations, the instructions in the apparatus, a Field Programmable Gate Array (FPGA) including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations or the third operations to instantiate baseline product hierarchies generator circuitry to generate a baseline product hierarchy using product information, categorical impact calculator circuitry to calculate categorical impact values for products in the baseline product hierarchy, average impact calculator circuitry to calculate an average impact value for the baseline product hierarchy using the calculated categorical impact values, impact based weighting circuitry to calculate a first weighting factor for respective ones of the products based on a comparison between the categorical impact values and the average impact value, sales data based weighting circuitry to calculate a second weighting factor associated with respective ones of the products in the baseline product hierarchy based on sales data, product relationships determiner circuitry to generate final weighted categorical impact values based on (a) the first weighting factors, (b) the second weighting factors and (c) the categorical impact values corresponding to the respective ones of the products, query analyzer circuitry to calculate response criteria corresponding to a product impact query based on a grouping of the products, and query response generator circuitry to select the final weighted categorical impact values associated with the response criteria to form a query result that identifies store shelf rearrangement instructions.

Example 15 includes the apparatus of example 14, wherein the baseline product hierarchies generator circuitry forms multiple baseline product hierarchies using the product information.

Example 16 includes the apparatus of example 15, wherein the product relationships determiner circuitry averages the final weighted categorical impact values across the multiple baseline product hierarchies to generate blended categorical impact values.

Example 17 includes the apparatus of example 14, wherein the categorical impact calculator circuitry calculates the categorical impact values using direct impact values from the product information and cross impact values from the product information.

Example 18 includes the apparatus of example 17, wherein the direct impact values indicate an effect of a category on itself.

Example 19 includes the apparatus of example 17, wherein the cross impact values indicate an effect of a category on its sibling categories.

Example 20 includes the apparatus of example 17, wherein the categorical impact calculator circuitry calculates the categorical impact values by adding the direct impact values and the cross impact values.

Example 21 includes the apparatus of example 14, wherein Q-values calculator circuitry calculates a confidence metric for respective ones of the final weighted categorical impact values, the confidence metric indicating a level of accuracy certainty.

Example 22 includes the apparatus of example 14, wherein the query response generator circuitry selects the final weighted categorical impact values associated with the response criteria in response to the associated confidence metric satisfying a threshold value.

Example 23 includes the apparatus of example 14, wherein the impact based weighting circuitry calculates the first weighting factor for each product to be a low weight in response to the average impact value for the baseline product hierarchy being greater than or equal to the associated categorical impact value.

Example 24 includes the apparatus of example 14, wherein the impact based weighting circuitry calculates the first weighting factor for each product to be a high weight in response to the average impact value for the baseline product hierarchy being less than the associated categorical impact value.

Example 25 includes the apparatus of example 14, wherein the query analyzer circuitry obtains the grouping of the products from the product information.

Example 26 includes the apparatus of example 14, wherein report generator circuitry is to report the query result to at least facilitate efficient rearrangement of store shelves to minimize product cannibalization, using the selected final weighted categorical impact values.

Example 27 includes a method to facilitate efficient rearrangement of store shelves to minimize product cannibalization, the method comprising generating a baseline product hierarchy using product information, calculating categorical impact values for products in the baseline product hierarchy, calculating an average impact value for the baseline product hierarchy using the calculated categorical impact values, calculating a first weighting factor for respective ones of the products based on a comparison between the categorical impact values and the average impact value, calculating a second weighting factor associated with respective ones of the products in the baseline product hierarchy based on sales data, generating final weighted categorical impact values based on (a) the first weighting factors, (b) the second weighting factors and (c) the categorical impact values corresponding to the respective ones of the products, calculating response criteria corresponding to a product impact query based on a grouping of the products, and selecting the final weighted categorical impact values associated with the response criteria to form a query result that identifies store shelf arrangement instructions.

Example 28 includes the method of example 27, wherein multiple baseline product hierarchies are formed using the product information.

Example 29 includes the method of example 28, wherein the final weighted categorical impact values are averaged across the multiple baseline product hierarchies to generate blended categorical impact values.

Example 30 includes the method of example 27, wherein the categorical impact values are calculated using direct impact values from the product information and cross impact values from the product information.

Example 31 includes the method of example 30, wherein the direct impact values indicate an effect of a category on itself.

Example 32 includes the method of example 30, wherein the cross impact values indicate an effect of a category on its sibling categories.

Example 33 includes the method of example 30, wherein the categorical impact values are calculated by adding the direct impact values and the cross impact values.

Example 34 includes the method of example 27, wherein a confidence metric is calculated for respective ones of the final weighted categorical impact values, the confidence metric indicating a level of accuracy certainty.

Example 35 includes the method of example 34, wherein the final weighted categorical impact values are associated with the response criteria are selected to form the query result in response to the associated confidence metric satisfying a threshold value.

Example 36 includes the method of example 27, wherein the first weighting factor for each product is calculated to be a low weight in response to the average impact value for the baseline product hierarchy being greater than or equal to the associated categorical impact value.

Example 37 includes the method of example 27, wherein the first weighting factor for each product is calculated to be a high weight in response to the average impact value for the baseline product hierarchy being less than the associated categorical impact value.

Example 38 includes the method of example 27, wherein the grouping of the products is obtained from the product information.

Example 39 includes the method of example 27, further including reporting the query result to at least facilitate efficient rearrangement of store shelves to minimize product cannibalization, using the selected final weighted categorical impact values.

From the foregoing, it will be appreciated that example methods, apparatus and articles of manufacture have been disclosed that extend the applications of product assortments and/or product impact analyses. Example methods and apparatus disclosed herein utilize multiple product hierarchies to debias and enable flexibility in addressing business issues (e.g., determining how to improve sales of a given product category, deciding how best to arrange a store shelf, etc.). Having the ability to perform blending of data from multiple product hierarchies, as weighted by product importance and/or an associated confidence level, allows for a reduction of error and/or an improvement of efficiency by, for example, reducing computational resources allocated to re-processing of large volumes of data when bias or discretionary error is discovered. Disclosed systems, methods, apparatus, and articles of manufacture are accordingly directed to one or more improvement(s) in the operation of a machine such as a computer or other electronic and/or mechanical device.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. At least one non-transitory machine-readable medium comprising machine-readable instructions to cause at least one processor circuit to at least:
   generate a first item hierarchy structure based on item information, the first item hierarchy structure having a parent category and first sub-categories;
   generate a second item hierarchy structure based on the item information, the second item hierarchy structure having the parent category and second sub-categories different than the first sub-categories;
   determine sub-category impact values for items in the first and second item hierarchy structures;
   determine average impact values for the first and second item hierarchy structures using the sub-category impact values;
   determine first weighting factors for ones of the items based on a comparison between the sub-category impact values and the average impact values;
   generate item relationship matrices for the first and second item hierarchy structures, respective ones of the item relationship matrices including the sub-category impact values modified by (a) second weighting factors associated with respective ones of the items in the first and second item hierarchy structures and (b) sales data;
   determine a confidence metric for final weighted categorical impact values, the final weighted categorical impact values corresponding to items in the first and second item hierarchy structures and determined based on (a) the first weighting factors (b) the second weighting factors, and (c) the modified sub-category impact values;
   generate blended categorical impact values based on (a) average values of the final weighted categorical impact values across the first and second item hierarchy structures and (b) the confidence metric of respective ones of the final weighted categorical impact values;
   select ones of the blended categorical impact values associated with response criteria corresponding to an item impact query, the selection of blended categorical impact values to form a query result that identifies, with a graphical user interface, impact metrics associated with items of the item impact query; and
   add ones of the items to a store shelf based on the impact metrics.

2. The at least one non-transitory machine-readable medium of claim 1, wherein the machine-readable instructions are to cause one or more of the at least one processor circuit to determine the sub-category impact values using direct impact values from the item information and cross impact values from the item information.

3. The at least one non-transitory machine-readable medium of claim 2, wherein the direct impact values indicate an effect of a category on itself.

4. The at least one non-transitory machine-readable medium of claim 2, wherein the cross impact values indicate an effect of a category on its sibling categories.

5. The at least one non-transitory machine-readable medium of claim 2, wherein the machine-readable instructions are to cause one or more of the at least one processor circuit to determine the sub-category impact values by adding the direct impact values and the cross impact values.

6. The at least one non-transitory machine-readable medium of claim 1, wherein the machine-readable instructions are to cause one or more of the at least one processor circuit to select final weighted categorical impact values associated with the response criteria to form the query result corresponding to impact metrics in response to the confidence metric satisfying a threshold value.

7. The at least one non-transitory machine-readable medium of claim 1, wherein the machine-readable instructions are to cause one or more of the at least one processor circuit to determine the first weighting factors for respective ones of the items to be a low weight in response to an average impact value for the first item hierarchy structure being greater than or equal to respective ones of the sub-category impact values.

8. The at least one non-transitory machine-readable medium of claim 1, wherein the machine-readable instructions are to cause one or more of the at least one processor circuit to determine the first weighting factors for respective ones of the items to be a high weight in response to an average impact value for the first item hierarchy structure being less than respective ones of the sub-category impact values.

9. The at least one non-transitory machine-readable medium of claim 1, wherein the machine-readable instructions are to cause one or more of the at least one processor circuit to determine the response criteria corresponding to the item impact query based on a grouping of the items from the item information.

10. The at least one non-transitory machine-readable medium of claim 1, wherein the machine-readable instructions are to cause one or more of the at least one processor circuit to report the query result to cause arrangement of the store shelf to reduce item cannibalization.

11. An apparatus comprising:
 interface circuitry;
 machine-readable instructions; and
 at least one processor circuit to be programmed by the machine-readable instructions to:
  generate a first item hierarchy structure based on item information, the first item hierarchy structure having a parent category and first sub-categories;
  generate an item hierarchy structure based on the item information, the second item hierarchy structure having the parent category and second sub-categories different than the first sub-categories;
  determine sub-category impact values for items in the first and second product item hierarchy structures;
  determine average impact values for the first and second item hierarchy structures using the sub-category impact values;
  determine first weighting factors for ones of the item based on a comparison between the sub-category impact values and the average impact values;
  automatically generate item relationship matrices for the first and second item hierarchy structures, respective ones of the item relationship matrices including the sub-category impact values modified by (a) second factors associated with respective ones of the items in the first and second item hierarchy structures and (b) sales data;
  determine a confidence metric for final weighted categorical impact values, the final weighted categorical impact values corresponding to items in the first and second item hierarchy structures and determined based on (a) the first weighting factors (b) the second weighting factors, and (c) the modified sub-category impact values;
  generate blended categorical impact values based on (a) average values of the final weighted categorical impact values across the first and second item hierarchy structures and (b) the confidence metric of respective ones of the final weighted categorical impact values;
  select ones of the blended categorical impact values associated with response criteria corresponding to an item impact query, the selection of blended categorical impact values to form a query result that identifies, with a graphical user interface, impact metrics associated with items of the item impact query; and
  adding ones of the item to a store shelf based on the impact metrics.

12. The apparatus of claim 11, wherein the confidence metric for final weighted categorical impact values indicates a level of accuracy certainty.

13. A memory for storing data for access by an executable program being executed on a data processing system, comprising:
 a data structure stored in the memory, the data structure including information resident in a database used by the executable program including:
  a first data object structured to generate a first item hierarchy structure based on item information, the first item hierarchy structure having a parent category and first sub-categories;
  a second data object structured to generate a second item hierarchy structure based on the item information, the second item hierarchy structure having the parent category and second sub-categories different than the first sub-categories;
  a third data object structured to determine sub-category impact values for items in the first and second item hierarchy structures;
  a fourth data object structured to determine average impact values for the first and second item hierarchy structures using the sub-category impact values;
  a fifth data object structured to determine first weighting factors for ones of the items based on a comparison between the sub-category impact values and the average impact values;
  a sixth data object structured to generate item relationship matrices for the first and second item hierarchy structures, respective ones of the item relationship matrices including the sub-category impact values modified by (a) second weighting factors associated with respective ones of the items in the first and second item hierarchy structures and (b) sales data;
  a seventh data object structured to determine a confidence metric for final weighted categorical impact values, the final weighted categorical impact values corresponding to items in the first and second item hierarchy structures and determined based on (a) the first weighting factors (b) the second weighting factors, and (c) the modified sub-category impact values; and
  an eighth data object structured to generate blended categorical impact values based on (a) average values of the final weighted categorical impact values across the first and second item hierarchy structures and (b) the confidence metric of respective ones of the final weighted categorical impact values,
 the executable program to select ones of the blended categorical impact values associated with response criteria corresponding to an item impact query, the selection of blended categorical impact values to form a query result that identifies, with a graphical user interface, impact metrics associated with items of the item impact query, the ones of the items added to a store shelf based on the impact metrics.

* * * * *

UNITED STATES PATENT AND TRADEMARK OFFICE
CERTIFICATE OF CORRECTION

| | | |
|---|---|---|
| PATENT NO. | : 12,412,186 B2 | Page 1 of 1 |
| APPLICATION NO. | : 17/955983 | |
| DATED | : September 9, 2025 | |
| INVENTOR(S) | : Stahl et al. | |

It is certified that error appears in the above-identified patent and that said Letters Patent is hereby corrected as shown below:

In the Claims

In Column 43, Claim 11, Line 47, delete "product".

Signed and Sealed this
Eleventh Day of November, 2025

John A. Squires
*Director of the United States Patent and Trademark Office*